(12) United States Patent
Nakanishi et al.

(10) Patent No.: US 6,327,093 B1
(45) Date of Patent: Dec. 4, 2001

(54) IMAGE DISPLAY APPARATUS

(75) Inventors: Hiroshi Nakanishi, Yawata; Hiromi Katoh, Nara, both of (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 09/587,361

(22) Filed: Jun. 2, 2000

(30) Foreign Application Priority Data

| Jun. 4, 1999 | (JP) | 11-158243 |
| Jun. 18, 1999 | (JP) | 11-172474 |
| Jul. 8, 1999 | (JP) | 11-193875 |
| Mar. 13, 2000 | (JP) | 12-069002 |

(51) Int. Cl.$^7$ ............ G02B 27/14; G03B 21/14; G02F 1/133
(52) U.S. Cl. ............ 359/634; 353/20; 349/9
(58) Field of Search ............ 359/634, 636, 359/637, 639; 348/335, 336, 337, 338, 339; 349/9; 353/20, 31, 33, 34, 37

(56) References Cited

U.S. PATENT DOCUMENTS

| 5,751,384 | 5/1998 | Sharp | 349/18 |
| 5,909,259 | * 6/1999 | Ishino | 349/9 |
| 6,089,719 | * 7/2000 | Lin | 353/33 |
| 6,183,090 | * 2/2001 | Nakanishi et al. | 353/20 |

FOREIGN PATENT DOCUMENTS

| 4-338721 A | 11/1992 | (JP) . |
| 5-158012 A | 8/1993 | (JP) . |

OTHER PUBLICATIONS

Murayama, "Current Status and Future Application of Reflective LCD Projector", Proceedings of Electronic Display Forum 97, Apr. 16, 1997–Apr. 18, 1997, pp. 3–27—3–32.

* cited by examiner

Primary Examiner—Georgia Epps
Assistant Examiner—Saied Seyrafi
(74) Attorney, Agent, or Firm—Nixon & Vanderhye, P.C.

(57) ABSTRACT

The image display apparatus of this invention includes: an illumination optical system for outputting a light beam of red, green, and blue three primary color light components in the state where two of the three color light components are different in polarization direction from the other color light component; a beam splitter for splitting the light beam output from the illumination optical system according to the polarization direction; a color separator for separating the two color light components having the same polarization direction: a plurality of reflection image display elements for modulating the light beams separated by the beam splitter and the color separator; and a projection optical system for projecting the light beams modulated by the plurality of reflection image display elements.

42 Claims, 36 Drawing Sheets

IMAGE DISPLAY APPARATUS

BACKGROUND OF THE INVENTION

The present invention relates to an image display apparatus, such as a liquid crystal projector, for projecting a light beam supplied from a light source via an image display element on a screen as a magnified image.

In a liquid crystal display (LCD) device having pixel electrodes arranged orderly in a matrix, driving voltages corresponding to image signals are applied to the respective pixel electrodes, to change the optical characteristics of a liquid crystal material sealed in the LCD device. In this way, the LCD device displays images, characters, and the like. The application of individual driving voltages to the pixel electrodes is realized by a simple matrix method or an active matrix method. In the latter method, the LCD device is provided with nonlinear two-terminal elements or three-terminal elements.

In the active matrix method, required are switching elements such as MIM (metal-insulator-metal) elements and thin film transistors (TFTs), as well as wiring electrodes for supplying driving voltages to the pixel electrodes.

Such an active matrix LCD device has drawbacks as follows. When intensive light is incident on the switching element, the resistance of the switching element in the OFF state lowers, resulting in discharging a charge accumulated during voltage application. Moreover, light leaks in the black state from the portions of the liquid crystal material corresponding to the regions where the switching elements and the wiring electrodes are formed, because such liquid crystal portions are not applied with a normal driving voltage and thus fail to participate in the display operation done by the other portions. This results in lowering the contrast ratio.

To overcome the above drawbacks, a transmission LCD device is required to provide a light-shading section called a black matrix 602 as shown in FIG. 31 for shading the above regions from incident light. Referring to FIG. 31, the black matrix 602 is formed on a counter substrate that faces via a liquid crystal layer a TFT substrate on which the switching elements such as TFTs 601 and pixel electrodes 605 are formed. The TFTs 601 as well as gate bus lines 603 and source bus lines 604 intrinsically have the light-shading property. Therefore, in the case of the transmission LCD device, the formation of the light-shading black matrix 602 further reduces the occupation of an effective pixel aperture in the entire area of a pixel, that is, the numerical aperture.

It is difficult to reduce the sizes of the switching elements and wiring electrodes below a certain level due to the restrictions in the electrical performance and production technology. Therefore, as the pitch of the pixel electrodes is made smaller in the course of implementation of more precise, smaller LCD devices, the numerical aperture is further reduced.

A reflection LCD device has been developed to solve the above problem.

In a reflection LCD device, as shown in FIG. 32, reflection type pixel electrodes 655 can be formed over TFTs 651 as the switching elements, thereby allowing for a larger numerical aperture than that of the transmission LCD device described above. The reflection LCD device is therefore very effective in improving the brightness of a projection LCD apparatus.

Applications of such a reflection LCD device to a projection LCD apparatus are proposed in Electronic display Forum 97 (pp. 3-27 to 3-32) and Japanese Laid-Open Patent Publication No. 4-338721.

The proposal in the Electronic Display Forum 97 is as shown in FIG. 33. A light beam emitted from a light source 701 is separated into light beams of the three primary colors of red (R), green (G), and blue (B) by dichroic mirrors. The three light beams are guided to be incident on corresponding polarization beam splitters (PBS) 702. The PBS 702 splits the incident light beam into two linearly polarized light components in directions orthogonal to each other. One of the light components is incident on a corresponding reflection LCD element 704. After being reflected from the reflection LCD elements 704, the R, G, and B light beams with a modulated polarization direction are incident again on the respective PBSs 702. The light beams are then combined by a cross dichroic mirror 703, and the combined light beam is projected on a screen via a projection lens 705.

The proposal of Japanese Laid-Open Patent Publication No. 4-338721 is as shown in FIGS. 34A and 34B. A light beam emitted from a light source 101 is split into two linearly polarized light beams by a PBS 105. One of the two light beams is separated into R, G, and B light beams by a color separation/combination element (a cross dichroic prism in FIG. 34A, and a Phillips type prism in FIG. 34B). After being reflected from respective reflection LCD elements 107-R, 107-G, and 107-B, the color light beams are combined by the color separation/combination element. The combined light beam is incident again on the PBS 105, where only the light components of which polarization direction has been modulated are incident on a projection lens 108 and projected on a screen.

The above method is implemented as a 3-panel type liquid crystal projector, which allows efficient use of the R, G, and B light beams from the light source and thus display of markedly bright images.

The 3-panel type liquid crystal projector uses all the R, G, and B light beams for display at all times (spatial color mixing). Another method called a time sequential method or a field sequential method is known, where a light beam for display is time-divided into the R, G, and B light beams to effect color display.

For example, in a liquid crystal projector disclosed in Japanese Laid-Open Patent Publication No. 5-158012, R, G, and B light components of a light beam emitted from a light source are sequentially selected in a time-division manner to be sequentially incident on a PBS. The PBS splits the incident light beam into a p-polarized light component and an s-polarized light component, and outputs one of the two light components (in the disclosed example, the s-polarized light component) to be incident on an image display element. The image display element receives a signal synchronized with the presently incident color light beam. Display is made for each cycle of the R, G, and B light beams as a unit (called a frame; the unit of display for each of the R, G, B light beams is called a field).

For the time-division display of the R, G, and B light beams, the disclosed liquid crystal projector uses a combination of a dichroic mirror and a shutter. The dichroic mirror separates white light emitted from the light source into the R, G, and B light beams. The shutter allows/blocks transmission of the separated color light beams. As an alteration, a rotary color filter 393 having R, G, and B transmission regions as shown in FIG. 39 may be used. The projector of this type (a single-panel type projector, named against the above 3-panel type projector) may be constructed of only one reflection image display element and only one PBS.

Moreover, it requires no individual optical systems for color separation and color combination, allowing for realization of an inexpensive, compact system.

However, the above conventional apparatuses have the following problems.

In the proposal in the Electronic Display Forum 97, three PBSs for the R, G, and B colors are required, together with the optical systems for color separation and the cross dichroic prism for color combination. This greatly increases not only the cost but also the size of the system.

In the proposal in Japanese Laid-Open Patent Publication No. 4-338721, the size of the system can be reduced because color separation and combination are implemented by one element and only one PBS is required. However, the construction using the cross dichroic prism has the following problem. Normally, light is incident on a color separation plane of the cross dichroic prism at an angle of 45°. This increases the polarization dependence of the spectral characteristics at the color separation plane as shown in FIG. 35 (FIG. 35 shows the spectral characteristics of B light at the color separation plane). Therefore, if both color separation and color combination are done by the cross dichroic prism, the bandwidth of light usable is greatly narrowed, resulting in poor light utilization efficiency and lowered color purity.

In the construction using the Phillips type prism, light is incident on the color separation plane at a small angle compared with that using the cross dichroic prism. Therefore, the polarization dependence as described above is reduced. The Phillips type prism however has a drawback that the optical path through the Phillips type prism is long. In order to allow incident light to pass through the Phillips type prism without an occurrence of extending off the side edges of the Phillips type prism, the prism and the projection lens must be large in size, which causes cost increase.

The time-division method disclosed in Japanese Laid-Open Patent Publication No. 5-158012 can solve the above problems of the 3-panel type projector. This is however disadvantageous in the following point. In the time-division method, the R, G, and B light beams from the light source are sequentially incident on the reflection image display element. Therefore, when the R light beam is under selection, for example, the remaining G and B light beams are substantially unusable, resulting in lowering in brightness to one third theoretically.

Moreover, assuming that one frame for image display is 1/60 second, for example, the display time allocated for each of the R, G, and B light beams is about 5 msec. Display of each color must be completed within this period of time. To satisfy this, the display element used must have a significantly high response speed. This causes a serious problem when a liquid crystal display element is used since it has a comparatively low response speed, unlike a CRT and the like.

Moreover, the time-division display of the R, G, and B primary colors tends to generate a phenomenon that the respective primary colors are observed separately from one another when moving images are displayed or when the line of sight moves (hereinafter, such phenomenon is referred to as color breaking), lowering the image quality. To reduce such color breaking, the driving frequency may be increased. To increase the driving frequency, however, the response speed of the display element must be further increased. This is also disadvantageous for the liquid crystal display element.

SUMMARY OF THE INVENTION

An object of the present invention is providing a projection image display apparatus using reflection LCD elements that is small in size, light in weight, and bright in display image.

The image display apparatus of the first aspect of the present invention includes: an illumination optical system for outputting a light beam of red, green, and blue three primary color light components in the state where two of the three color light components are different in polarization direction from the other color light component; a beam splitter for splitting the light beam output from the illumination optical system according to the polarization direction; a color separator for separating the two color light components having the same polarization direction: a plurality of reflection image display elements for modulating the light beams separated by the beam splitter and the color separator; and a projection optical system for projecting the light beams modulated by the plurality of reflection image display elements, whereby the above object is attained.

Preferably, the angle formed by a beam splitting plane of the beam splitter and a color separation plane of the color separator is 20° or less.

The illumination optical system may include: a light source for emitting the light beam of the three primary color light components; and a first polarization control element for changing the polarization direction of at least one of the three primary color light components.

A polarization selection element for transmitting or reflecting only a polarized light beam having a given polarization direction may be placed on an optical path on the light incident side of the first polarization control element.

Preferably, the color separation plane of the color separator is sandwiched by two substrates. In this case, a transparent substrate is placed on at least one of optical paths of the light beams split by the beam splitter. Especially, a substrate having a thickness corresponding to the total thickness of the two substrates of the color separator is preferably placed on the optical path of one of the light beams split by the beam splitter that is incident on one of the plurality of reflection image display elements without being via the color separator. The transparent substrate may also be used for a construction of the color separator other than the above construction having the color separation plane sandwiched by two substrates, if required.

The color separator may be a square pole prism made of two triangle pole prisms bonded to each other.

Preferably, the principal ray of a light beam incident on and outgoing from the square pole prism is roughly in parallel with the normal of an incidence plane and an outgoing plane of the square pole prism, and the principal ray is incident on a beam splitting plane of the square pole prism at an angle less than 45° with respect to the normal of the beam splitting plane.

The color separation plane of the color separator may be formed on a surface of a substrate so as to face the beam splitter and transmits the blue light component, and the two color light components having the same polarization direction may include the blue light component.

A second polarization control element for equalizing the polarization directions of the red, green, and blue three primary color light components may be placed on the side of the beam splitter closer to the projection optical system.

A polarization selection element for transmitting or reflecting only a polarized light beam having a given polarization direction may be placed on an optical path on the light outgoing side of the second polarization control element.

Preferably, at least one wavelength regulation element is inserted on the optical path between the light source and the projection optical system.

Preferably, the wavelength regulation element cuts a light beam in a wavelength range at the boundary between the light beam of which polarization direction is changed by the first polarization control element and another light beam.

Preferably, the wavelength regulation element is placed at least one of optical paths of the light beams split by the beam splitter, and cuts the light beams other than the light beam corresponding to any of the plurality of reflection image display elements placed on the optical path on which the wavelength regulation element is placed.

Preferably, the wavelength regulation element cuts a light component in at least one of a red-green boundary wavelength range and a green-blue boundary wavelength range. In the case where the green and blue light components have the same polarization direction, a light component in the red green boundary wavelength range is preferably cut, and in the case where the red and green light components have the same polarization direction, a light component in the green-blue boundary wavelength range is preferably cut.

The wavelength regulation element is preferably placed between the beam splitter and any of the reflection image display elements, and a light regulation plane of the wavelength regulation element is preferably tilted at an angle with respect to an image display plane of the reflection image display element. That is, these two planes are preferably not in parallel with each other. Preferably, the angle of the light regulation plane of the wavelength regulation element with respect to the image display plane of the reflection image display element is in the range of 1.5° to 13.5°.

Preferably, the green light component among the red, green, and blue primary color light components is included in the two color light components having the same polarization direction.

Preferably, the beam splitting plane of the beam splitter has a transmittance for p-polarized light and a reflectance for s-polarized light one of which is higher than the other, and the light beam split by the beam splitter as the polarized light having the higher transmittance or reflectance is incident on two or more of the plurality of reflection image display elements.

Preferably, the beam splitting plane of the beam splitter has a transmittance for p-polarized light and a reflectance for s-polarized light one of which is higher than the other, and the green light beam is split by the beam splitter as the polarized light having the higher transmittance or reflectance.

The image display apparatus of the second aspect of the present invention includes: an illumination optical system for dividing a light beam of red, green, and blue three primary color light components into two color light groups, sequentially switching the two color light groups in a timedivision manner, and outputting after changing the polarization direction of two of the three primary color light components to be different from the polarization direction of the other color light component; a beam splitter for splitting the light beam output from the illumination optical system according to the polarization direction; a plurality of reflection image display elements for modulating light beams split by the beam splitter; and a projection optical system for projecting the light beams modulated by the plurality of reflection image display elements, whereby the above object is attained.

The illumination optical system may includes: a light source for emitting the light beam of the three primary color light components; a color switch element for sequentially switching the two different color light groups each including two of the three primary color light components emitted from the light source; and a first polarization control element for changing the polarization direction of the color light component commonly included in the two different color light groups or the polarization direction of the two color light components other than the common color light component.

The apparatus may further include a second polarization control element having substantially the same function as the first polarization control element on the side of the beam splitter closer to the projection optical system.

The apparatus may further include a polarization selection element for transmitting only a polarized light component having a given polarization direction on a light path on the light incident side of the first polarization control element.

The apparatus may further include a polarization selection element for transmitting only a polarized light component having a given polarization direction on a light path on the light outgoing side of the second polarization control element.

The color switch element may keep selecting the color light group including a color light component having a lower intensity than the other of the two color light components other than the common color light component included in the two different color light groups for a longer time than the color light group including the other color light component.

The green color light component may be included only in one of the two different color light groups selected by the color switch element, and the color switch element may keep selecting the color light group including the green color light component for a longer time than the other color light group.

The common color light component included in the two different color light groups may be a light component having the lowest intensity among the three primary color light components.

The common color light component included in the two different color light groups may be the green light component.

The color switch element may simultaneously select the red, green, and blue primary color light components for a given period of time.

Alternatively, the illumination optical system may include: a light source for emitting the light beam of the three primary color light components; a color switch element for sequentially switching one color light group including two of the three primary color light components emitted form the light source and the other one color light component; and a first polarization control element for changing the polarization direction of one of the two color light components included in the color light group or the other one color light component.

The apparatus may further include a second polarization control element having substantially the same function as the first polarization control element on the side of the beam splitter closer to the projection optical system.

The apparatus may further include a polarization selection element for transmitting only a polarized light component having a given polarization direction on a light path on the light incident side of the first polarization control element.

The apparatus may further include a polarization selection element for transmitting only a polarized light component having a given polarization direction on a light path on the light outgoing side of the second polarization control element.

The color switch element may select between the color light group including two color light components and the other one color light component so that the color light component having the lowest intensity among the three primary color light components is included in either the color light group including two color light components or the other one color light component whichever is kept selected for a longer time.

The color switch element may select between the color light group including two color light components and the other one color light component so that the green light component is included in either the color light group including two color light components or the other one color light component whichever is kept selected for a longer time.

The color switch element may simultaneously select the red, green, and blue primary color light components for a given period of time.

The plurality of reflection image display elements may be two reflection image display elements, one corresponding to one of the three primary color light components and the other corresponding to the remaining two color light components.

At least one wavelength regulation element may be inserted on an optical path between the illumination optical system and the projection optical system.

The wavelength regulation element may be placed between the beam splitter and at least one of the plurality of reflection image display elements and selectively transmit a color light beam used for display by the at least one reflection image display element.

The wavelength regulation element may be placed between the beam splitter and one of the plurality of reflection image display elements on which the common color light component included in the two different color light groups is incident, and selectively transmit the common color light component.

The wavelength regulation element may cut a light component in a wavelength range at a boundary between a light component of which polarization direction is changed by the polarization control element and another light component.

DESCRIPTION OF THE PREFERRED EMBODIMENTS

EMBODIMENT 1

An illumination optical system of an image display apparatus of EMBODIMENT 1 of the present invention outputs a light beam of the three primary colors in the state where the polarization direction of one of the three color light components is different from that of the other two color light components. In other words, two of the three primary color light components are polarized in the same polarization direction that is different from that of the remaining color light component. A beam splitter (polarization beam splitter) splits the light beam received from the illumination optical system into light beams having different polarization directions. In the above case, therefore, the light beam is split into a light beam of two color light components having the same polarization direction and a light beam of the remaining color light component. A color separator of the image display apparatus of EMBODIMENT 1 of the present invention separates the light beam of two color light components having the same polarization direction into the respective color light beams.

With the above construction, the image display apparatus of EMBODIMENT 1 of the present invention is not required to use either the cross dichroic prism or the Phillips type prism for color separation (and color combination). This minimizes the conventional problems of lowering in brightness, color purity, and contrast ratio due to the polarization dependence of the cross dichroic prism or the Phillips type prism. In addition, not only size reduction but also substantial cost reduction of the image display apparatus are possible.

The beam splitting plane of the beam splitter (e.g., a PBS) may be positioned at an angle of 20° (absolute) or less with respect to the color separation plane of the color separator (e.g., a dichroic mirror). This further improves the contrast ratio. The angle formed by the beam splitting plane and the color separation plane is preferably 10° or less, more preferably roughly in parallel with each other (about 0°). The reason will be described with reference to FIGS. 36A and 36B.

The beam splitter normally splits an incident light beam into a p-polarized light beam and an s-polarized light beam. The p-polarized and s-polarized light beams are defined by the direction of the polarization with respect to the plane including the optical path of a light beam incident on the beam splitting plane and the normal to the beam splitting plane. In general, a light beam incident on the beam splitter is not a perfectly collimated light beam, but has a divergence angle θ of some degree. Therefore, the polarization direction (oscillation direction) of a split light beam from the beam splitter as a reflected light beam or a transmitted light beam is different from the polarization direction of a p-polarized light beam or an s-polarized light beam obtained by splitting a perfectly collimated light beam.

Figure 36A:
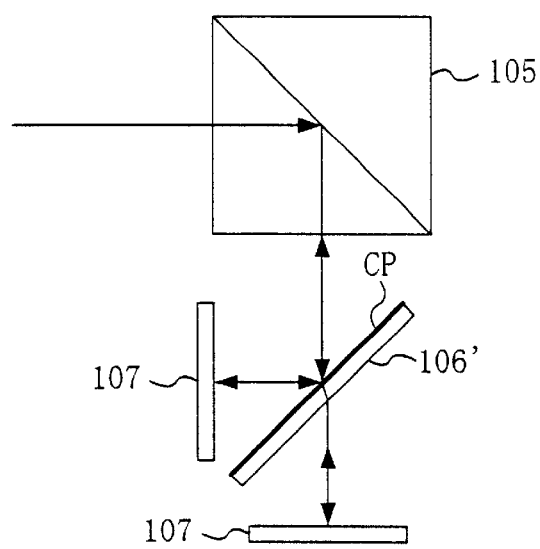
FIGS. 36A and 36B are illustrations of the position of a dichroic mirror for color separation.

Referring to FIG. 36A, consider the case where a light beam having a divergence angle is reflected from the beam splitter 105 and incident on a color separation plane of a color separator 106' that is positioned substantially orthogonal to a beam splitting plane of the beam splitter 105. This light beam has a polarization direction with respect to the color separation plane deviated from that of a p-polarized or s-polarized light beam. On the color separation plane, in general, a phase shift is generated depending on the polarization direction of a linearly polarized light beam (p-polarized light beam and s-polarized light beam with respect to the light incidence plane). Therefore, the light beam having a divergence angle is influenced by this phase shift, resulting in being output from the color separator 106' as an elliptical polarized light beam. This lowers the contrast ratio.

Figure 36B:
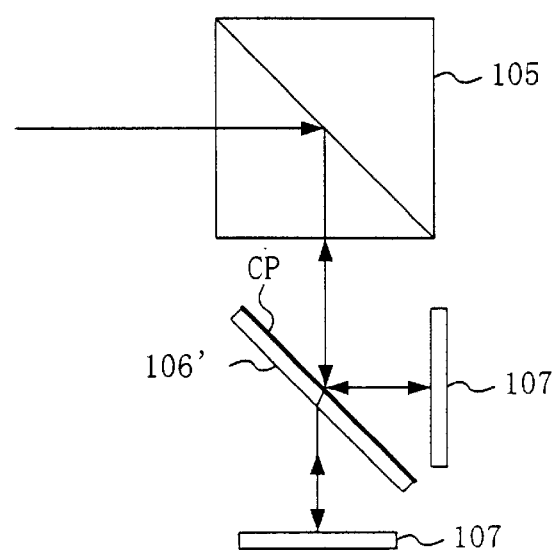

On the contrary, in the case shown in FIG. 36B where the color separation plane is positioned substantially parallel to the beam splitting plane, the polarization directions of an s-polarized light beam and those of a p-polarized light beam with respect to these two planes are the same (for example, if the light beam is an s-polarized light beam with respect to the color separation plane, it is also an s-polarized light beam with respect to the beam splitting plane). Therefore, even if a phase shift is generated at the color separation plane, the polarization state is kept unchanged since only either the p-polarized light beam or the s-polarized light beam exists. This improves the contrast ratio.

In FIG. 36B, the beam splitting plane of the beam splitter and the color separation plane of the color separator are placed in parallel with each other. If the angle of the color separation plane with respect to the beam splitting plane is deviated within the range of about ±20° from the angle (0°) shown in FIG. 36B, the resultant contrast ratio is still higher than the case shown in FIG. 36A although the effect decreases.

The illumination optical system used in the image display apparatus of the present invention is essentially constructed of a light source for emitting a white light beam and a first polarization control element for rotating the polarization direction of at least one of the R, G, and B light components, for example. This construction enables a light beam having a predetermined polarization direction to be efficiently incident on a corresponding reflection image display element, thereby enhancing the brightness. The light beam of R, G, and B emitted from the light source may be changed to a linearly polarized light beam by use of a polarizing plate, for example.

For example, the first polarization control element may be an element as disclosed in U.S. Pat. No. 5,751,384. This element includes a plurality of wave plates (also called phase plates) stacked on each other with different angles of their axes (optic axes, e.g., slower axes), so that the polarization direction of only a light component in a specific wavelength range can be rotated. For example, referring to FIG. 4, assume that a polarization control element 104 can rotate the polarization direction of the B light component. When a white linearly polarized light beam is incident on the polarization control element 104, only the polarization direction of the B light component of the output light beam has been rotated while the polarization directions of the remaining R and G light components are kept unchanged.

The color separator having the color separation plane sandwiched by two plates (parallel plates) generates roughly the same amount of astigmatism for two separated color light beams. Such astigmatism can therefore be compensated by a projection optical system. In order to have the same generation amount of astigmatism for two separated color light beams, the two plates sandwiching the color separation plane should preferably have the same refractive index and thickness. This will be described with reference to FIGS. 5 and 37.

In the case of projection of an image formed by a light beam modulated by the image display element, astigmatism is generated if a parallel plate such as a color separator is inserted between a projection lens and the image display element. Such astigmatism causes distortion in the image on a screen.

Figure 37:
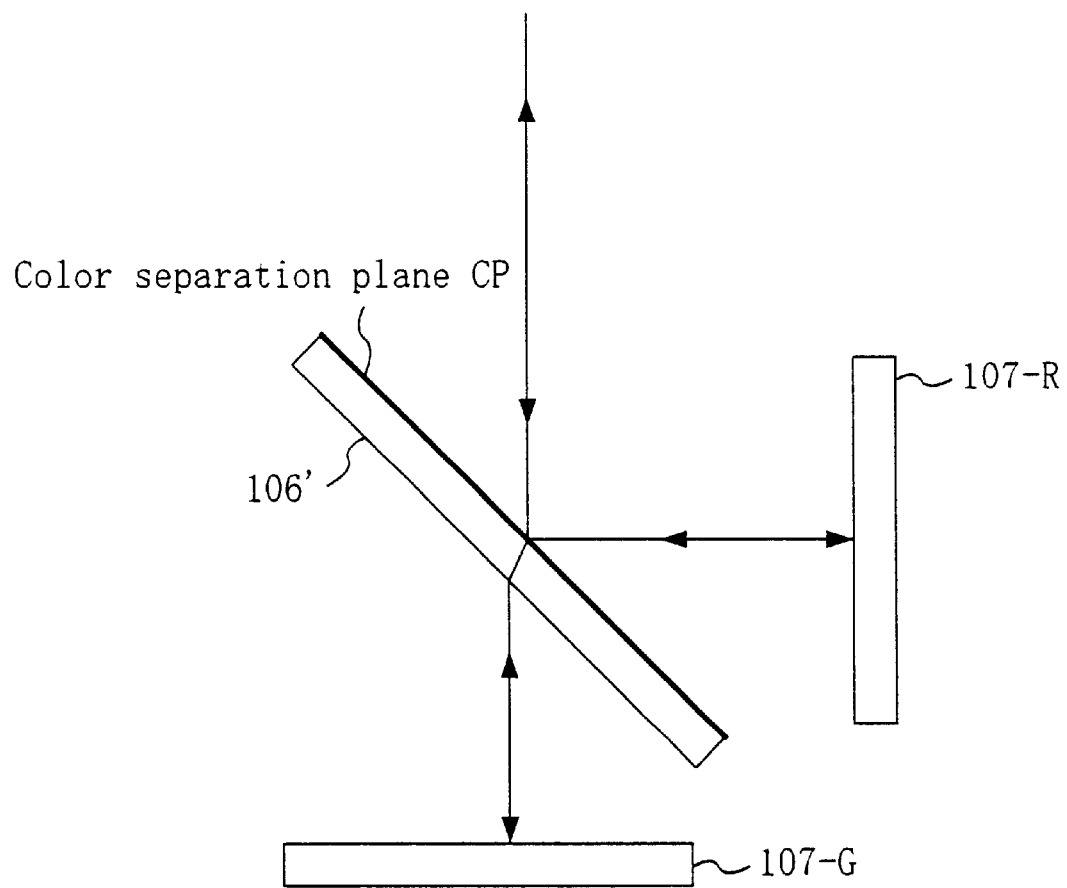
FIG. 37 is an illustration of a conventional dichroic mirror for color separation.

In the conventional color separator 106' shown in FIG. 37, a color separation plane CP (typically, a dielectric multilayer film) is formed on one surface of a parallel plate. In this construction, a light beam reflected from a reflection image display element 107-R toward the color separator 106', for example, is reflected on the surface of the color separator 106' (the color separation plane CP), thereby generating no astigmatism. On the contrary, a light beam reflected from a reflection image display element 107-G passes through the color separator 106' (including the parallel plate), generating astigmatism. This results in that astigmatism is generated for only one light beam out of the two light beams reflected from the reflection image display elements 107-R and 107-G. Compensation of such astigmatism by the projection optical system is difficult.

Figure 5:
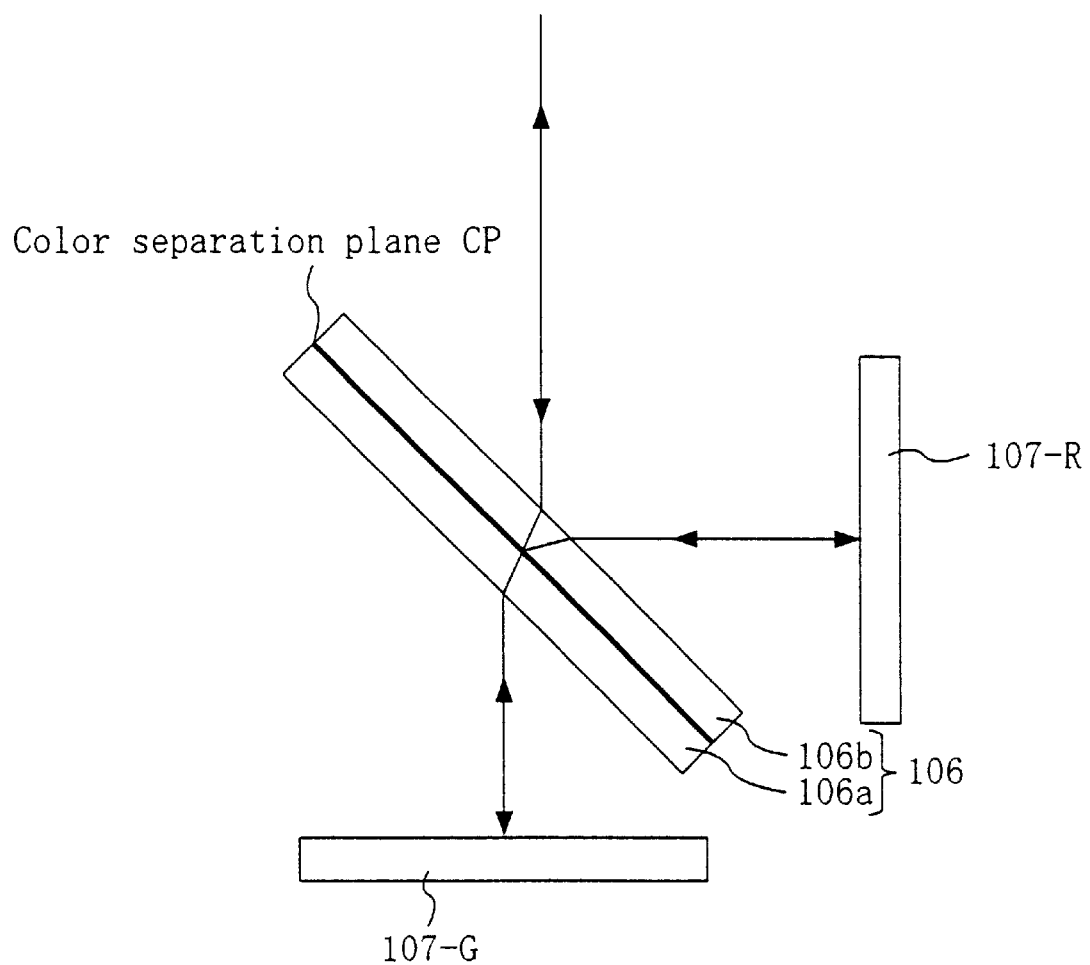
FIG. 5 is a structural view of a dichroic mirror.

In order to solve the above problem, a color separator 106 shown in FIG. 5 having a color separation plane CP sandwiched by two glass plates (transparent parallel plates) 106a and 106b may be used. With this construction, light beams reflected from the reflection image display elements 107-R and 107-G pass through the glass plates of the color separator 106 for the same distances. This construction enables resultantly generated astigmatism to be compensated by the projection optical system. As a result, good images free of distortion due to astigmatism can be displayed.

In addition, a light beam is allowed to be incident on the color separation plane of the color separator 106 at an angle smaller than the incident angle with respect to the color separation plane of the cross dichroic prism (typically, 45°). This is because the light beam is refracted on the surfaces of the glass plates 106a and 106b sandwiching the color separation plane. This greatly reduces the influence of the polarization dependence of the color separation plane described above.

Figure 1:
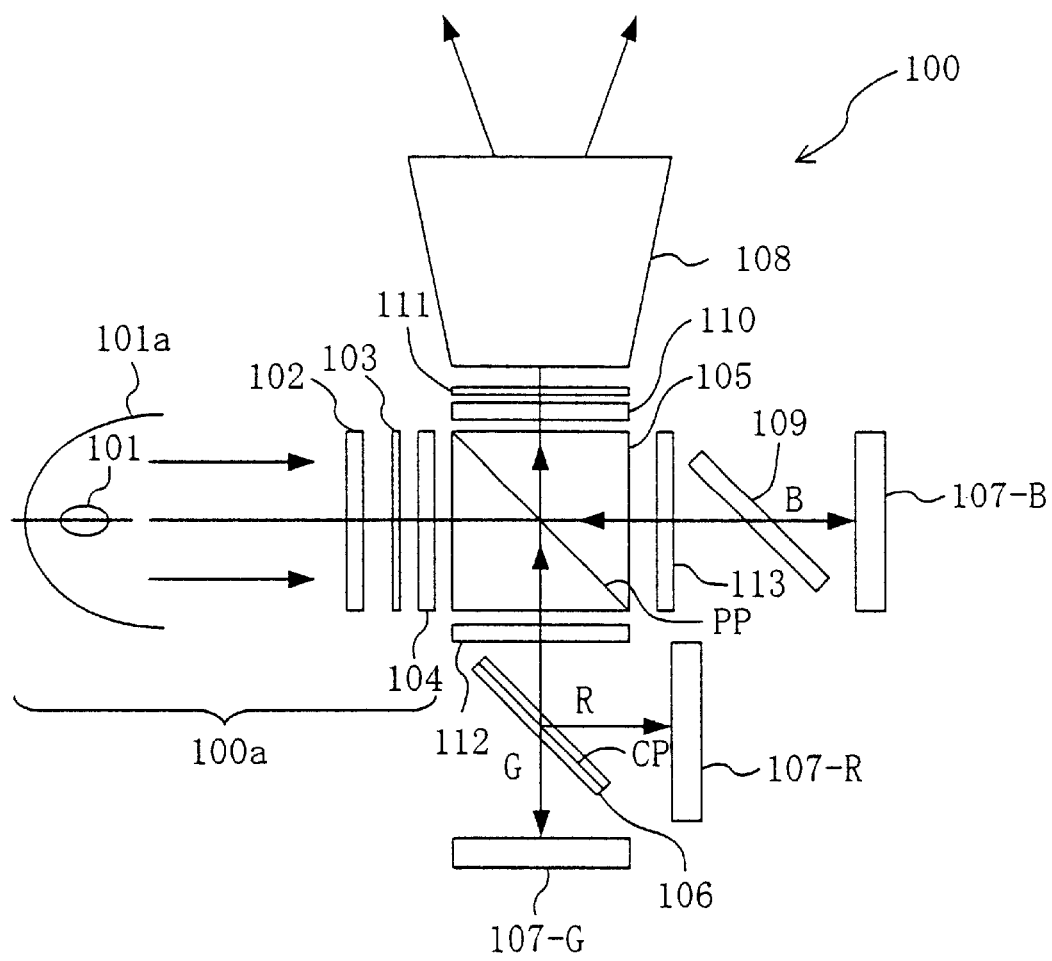
FIG. 1 is a schematic view of a projection color image display apparatus of EMBODIMENT 1 of the present invention.

In the arrangement of three reflection image display elements corresponding to R, G, and B light beams as shown in FIG. 1, no color separator is necessary on the optical path to the reflection image display element 107-B. Therefore, astigmatism is not generated for the B light beam. On the contrary, astigmatism is generated on the optical path to the reflection image display elements 107-R and 107-G by the existence of the color separator 106 as described above. This means that astigmatism is generated in only R and G light beams among the R, G, and B light beams to be projected via the projection optical system (projection lens) 108. Compensation of such astigmatism by the projection optical system is difficult.

In order to solve the above problem, a transparent plate 109 is inserted on the optical path of the light beam reflected from the reflection image display element 107-B, so that the generation amounts of astigmatism for the R, G, and B light beams are made equal to one another. This enables resultantly generated astigmatism to be compensated by the projection optical system 108. As a result, good images are obtained. As is apparent from FIG. 1, in order to ensure the same amount of astigmatism for the three color light beams, the transparent plate 109 is preferably the same in material and thickness (total thickness of the two plates) as the plates of the color separator 106. Also, the transparent plate 109 is preferably placed with respect to the optical path of the B light beam at the same angle as the angle of the color separator 106 (color separation plane) with respect to the optical path of the R and G light beams.

The polarization direction of one color light beam (B light beam in the example shown in FIG. 1) is different from that of the other two color light beams (R and G light beams). Therefore, the R, G, and B light beams of which polarization directions have been modulated by the respective reflection image display elements may be equalized in polarization direction by a second polarization control element that is placed on one side of the beam splitter (also serving as a light combination element) closer to the projection optical system. This permits use of a polarization screen that can keep a high contrast ratio even under bright illumination. The polarization screen has a polarizing plate bonded to the screen surface for cutting a half of incident random polarized light (non-polarized light). The polarization screen may be arranged so that the transmission axis of the polarizing plate matches with the polarization direction of the light beam output from the projector (projection image display apparatus). By this arrangement, while projected light from the projector is little cut, influence of external light is halved, thereby allowing for display with a high contrast ratio. The contrast ratio can further be improved by placing a polarization selection element (typically a polarizing plate) to be described below downstream of the second polarization control element (on the side closer to the projection optical system).

A polarization selection element may be placed on the optical path on the incident side of the first polarization control element. With this construction, a linearly polarized light beam is incident on the first polarization control element. As a result, color separation/polarized beam splitting (and color combination/polarized light combination) can be efficiently done by the first polarization control element and the beam splitter, thereby allowing for display of a bright image with a high contrast ratio.

A polarization selection element may be placed on the optical path on the light outgoing side of the second polarization control element. With this arrangement, even if a light component that should have been returned toward the light source by the beam splitter passes through the beam splitter, it is cut by the polarization selection element. This contributes to displaying an image with a high contrast ratio.

By the insertion of a wavelength regulation element, it is possible to regulate a light component in a certain wavelength range or a light component having a certain polarization direction that should not be incident on the respective reflection image display elements. This improves the color purity and prevents the contrast ratio from lowering.

The polarization direction of the two color light beams is different from that of the other color light beam when these color light beams are incident on the respective reflection image display elements. As a result, there arises a wavelength range where a p-polarized light component and an s-polarized light component are mixed at the boundary between the two color light beams having the same polarization direction and the other light beam. The wavelength regulation element cuts a light component in such a polarized light mixed wavelength range, thereby improving the contrast ratio and the color purity.

The polarization control element may generate partial polarization disturbance in a light beam of which polarization has been only incompletely rotated or a light beam of which polarization should not have been rotated, depending on the characteristics of the polarization control element. Also, the beam splitter may fail to completely split a light beam in accordance with the polarization direction. These cause color mixing and lowering in contrast ratio. By inserting the wavelength regulation element between the beam splitter and the reflection image display element, a light beam other than the color light beam corresponding to the reflection image display element can be cut. This improves the color purity and the contrast ratio.

The wavelength regulation element may cut a light component in at least one of the red-green boundary wavelength range and the green-blue boundary wavelength range. This improves the color purity. The wavelength regulation element for this purpose may be used jointly with the above wavelength regulation element for cutting a light beam other than the corresponding color light beam. In this case, it is preferable to use a wavelength regulation element having both spectral characteristics of the above two types of wavelength regulation elements.

As described above, there exists a wavelength range where a p-polarized light beam and an s-polarized light beam are mixed at the boundary between two color light beams having the same polarization direction and the other light beam. Such a polarized light mixed wavelength range should desirably be cut because it tends to influence the contrast ratio.

Figure 38:
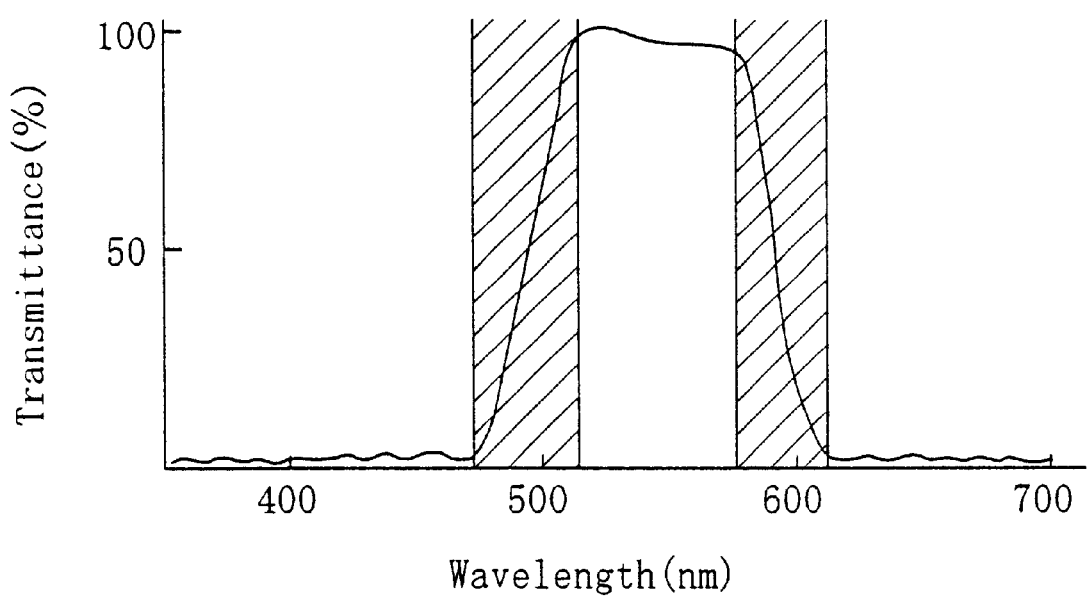
FIG. 38 shows the spectral characteristics of a polarization control element observed when the polarization directions of red and blue light beams are the same.

In the case where the polarization directions of the R and B light beams are the same, required to be cut are light components on the short-wavelength side (B side) and the long-wavelength side (R side) of the G wavelength band as shown by the hatched portions in FIG. 38. Therefore, in order to secure the G wavelength band, the R and B wavelength bands are narrowed. In reverse, in order to secure the R and B wavelength bands, the G wavelength band is narrowed. In either case, the brightness and the color purity are lowered.

Figure 2:
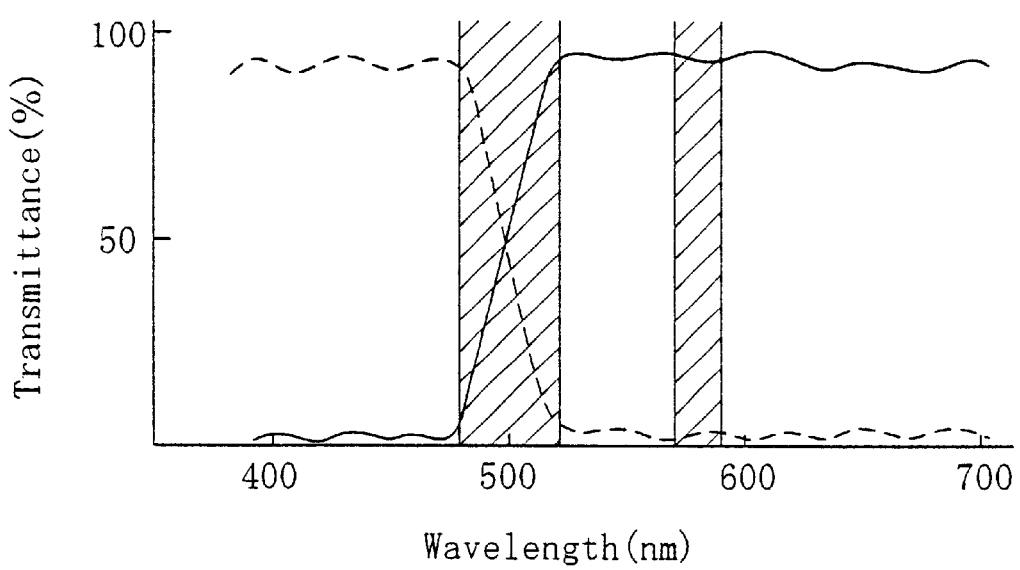
FIG. 2 shows the spectral characteristics of a polarization control element used in EMBODIMENT 1.

On the contrary, in the case where the polarization directions of the R and G light beams or the polarization directions of the B and G light beams are the same, required to be cut are only the light components in the wavelength bands shown by the hatched portions in FIG. 2, for example (FIG. 2 shows the case where the polarization directions of the R and G light beams are the same). This widely improves the color purity while minimizing lowering in brightness.

Figure 7A:
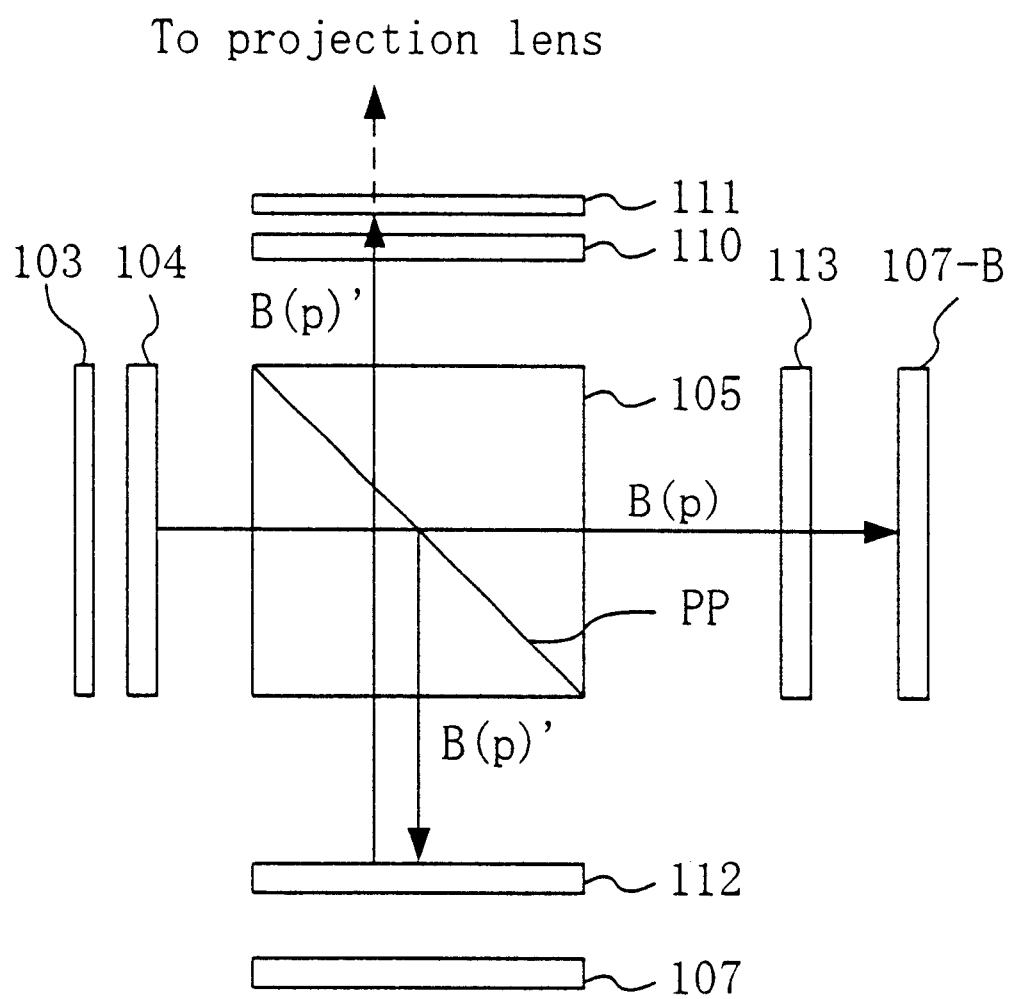
FIG. 7A is a schematic view of a layout of optical elements in the periphery of a PBS of the projection color image display apparatus of EMBODIMENT 1.
Figure 7B:
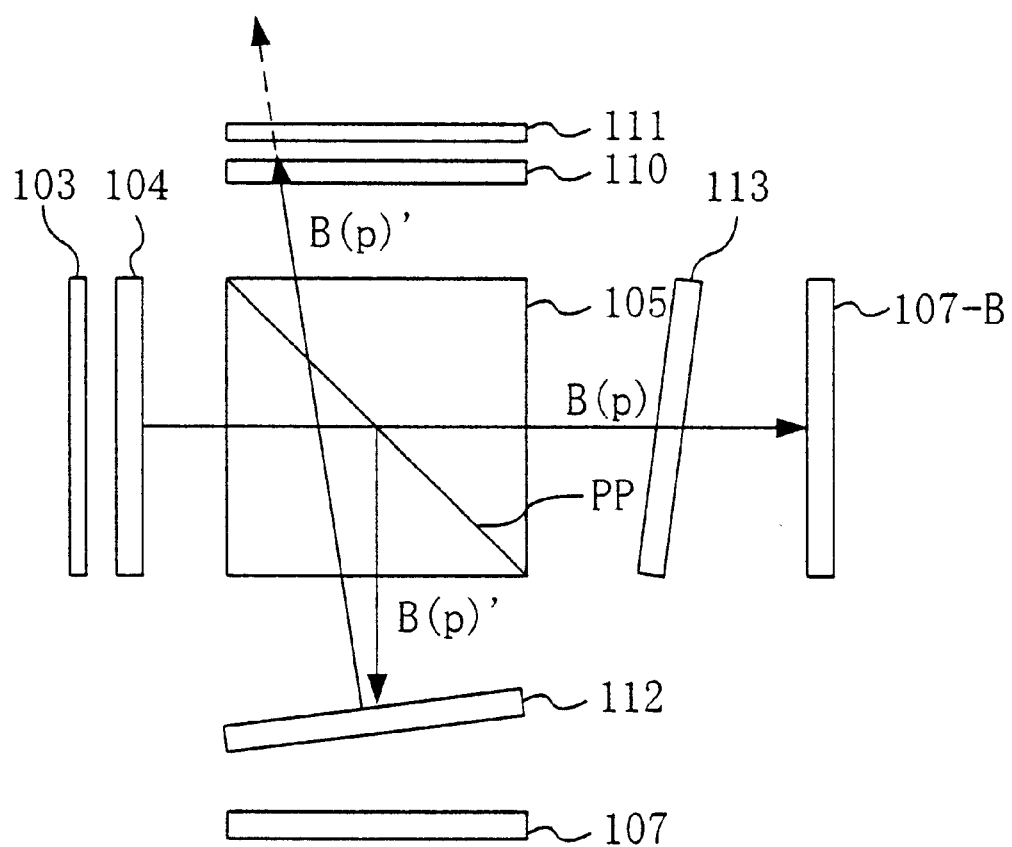
FIG. 7B is a schematic view of a modification of the layout shown in FIG. 7A.

The wavelength regulation element may be placed between the color splitter and the reflection image display element so that the wavelength regulation plane of the wavelength regulation element is tilted at a certain angle with respect to the image display plane of the reflection image display element (see FIG. 7B). This improves the contrast ratio due to the following reason.

If the extinction ratio (polarization selection ratio) of the beam splitter is insufficient, an unwanted polarized light component (that should have been output toward another reflection image display element) may mistakenly be output toward the reflection image display element together with the right polarized light component. Such unwanted polarized light component is incident on the wavelength regulation element located between the beam splitter and the reflection image display element and reflected from the wavelength regulation plane. If the wavelength regulation plane is in parallel with the surface of the reflection image display element, the unwanted polarized light component reflected from the wavelength regulation plane returns toward the projection optical system, resulting in lowering the contrast ratio of the display. In order to avoid this problem, the wavelength regulation plane is tilted at an angle (more than 0° and less than 90°) with respect to the image display plane of the reflection image display element. By this tilt arrangement, the unwanted polarized light component is reflected toward the projection light system at an angle different from the angle for the right polarized light component used for display, so as to be easily removed by the projection light system. In particular, by setting the angle between the wavelength regulation plane and the image display plane at about 1.5° to 13.5°, the unwanted polarized light component can be easily removed by use of a normal projection lens of F No. 1 to 8.

Figure 12:
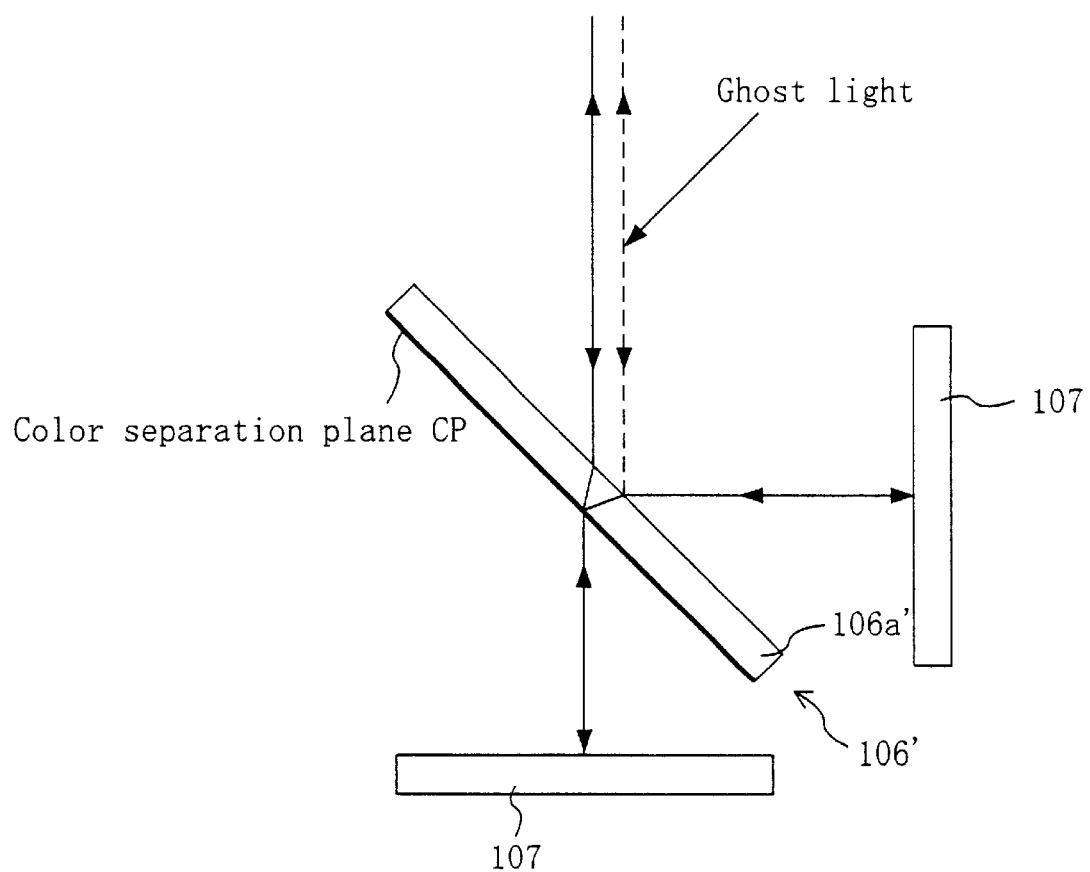
FIG. 12 is a schematic illustration of the ghost phenomenon generated in a conventional dichroic mirror.

If a prism color separator that does not cause astigmatism is used, the resultant display quality improves, or no special design is required for the projection optical system for compensating astigmatism. In the case of using a plate color separator, a phenomenon called ghost where an image is doubled is generated on a screen as shown in FIG. 12 by the reflection from the surface of the plate color separator opposite to the color separation plate CP. On the contrary, in the case of using a prism color separator, a light beam reflected from the reflection image display element is incident on the surface of the prism. Part of the light beam is reflected from the surface of the prism, but it is returned toward the reflection image display element, not toward the screen. Therefore, the display quality is prevented from lowering due to reflection of light from the prism surface. Such a color separation prism is typically a square pole prism obtained by bonding two triangle pole prisms to each other via a dielectric multilayer film on the bonding surface. The bonding surface (dielectric multilayer film) serves as the color separation plane.

As the incident angle of light with respect to the color separation plane of the color separation prism is larger, the polarization dependence of the color separation characteristics (wavelength selection property) of the color separation plane increases, lowering the color separation efficiency. For example, in the case of a typical square pole prism made of right triangle pole prisms bonded to each other, the light incident angle is 45° with respect to the color separation plane thereof. This results in a large polarization dependence and poor color separation efficiency. By using a parallelogram pole prism made of two isosceles triangle pole prisms having a dull vertical angle bonded to each other, the light incident angle with respect to the color separation plane of the prism can be reduced to less than 45°. This prism is therefore capable of minimizing the polarization dependence of the color separation characteristics and as a result improving the color separation efficiency of the color separator.

As the color separator, the dichroic mirror having a sandwich structure or the dichroic prism is preferably used. A dichroic mirror having a color separation plane CP on one surface of a transparent substrate (see FIG. 37) may also be used. In the latter case, the color separation plane CP is placed on the surface facing the beam splitter (PBS). This arrangement can minimize generation of ghost compared with the arrangement shown in FIG. 12. In addition, no astigmatism is generated for the R or G light beam reflected from the color separation plane CP formed (exposed) on the surface of the transparent substrate, but astigmatism is generated for the B light beam that passes through the color separation plane CP (see FIG. 14). Since the spectral luminous efficacy of the B light beam is lowest, this astigmatism does not influence the resolution of the resultant display image. Therefore, by using the dichroic mirror permitting only the B light beam having the lowest spectral luminous efficacy to pass therethrough, the generation of ghost can further be minimized and lowering in resolution due to astigmatism can be minimized.

In the polarization control element made of a plurality of wave plates stacked on each other described above, a larger number of wave plates is required for rotating the polarization directions of the R and B light components or the R and G light components, than for rotating the polarization direction of the R light component or the B light component. Therefore, by using the polarization control element for rotating the polarization direction of the R light component or the B light component, the number of wave plates can be small and thus cost reduction is possible.

In general, the polarized beam splitting characteristics (selectively transmitting p-polarized light and selectively reflecting s-polarized light) of the beam splitting plane of the beam splitter depends on the wavelength range of the light. It is difficult to optimize both the transmittance for p-polarized light and the reflectance for s-polarized light. If one characteristic (e.g., transmittance for p-polarized light) is optimized, the other characteristic (reflectance for s-polarized light) lowers.

In view of the above, the display quality can be improved by the following construction. That is, either one of the transmittance for p-polarized light and the reflectance for s-polarized light, of the beam splitting plane of the beam splitter is optimized. The polarized light having the optimized characteristic may be incident on two or more reflection image display elements. Alternatively, the G light beam having the highest spectral luminous efficacy among the three primary color light beams may be separated by the beam splitter as the polarized light having the optimized characteristic. This also improves the display quality.

Hereinafter, EMBODIMENT 1 of the present invention will be described concretely with reference to the accompanying drawings.

FIG. 1 is a schematic view of a projection color image display apparatus 100 of EMBODIMENT 1 of the present invention. In FIG. 1 and the following drawings, components having substantially the same functions are denoted by the same reference numerals.

The image display apparatus 100 includes: an illumination optical system 100a that outputs a light beam of the three primary colors of red (R), green (G), and blue (B) so that two of the three color light components have a polarization direction different from that of the other one color light component; a polarization beam splitter (PBS) 105 as the beam splitter that splits the light beam output from the illumination optical system 100a according to the polarization direction; a dichroic mirror 106 as the color separator that separates the light beam of two colors having the same polarization direction; reflection image display elements 107-R, 107-G, and 107-B that respectively modulate the R, G, and B light beams separated from one another by the PBS 105 and the dichroic mirror 106; and a projection optical system (projection lens) 108 that projects the light beams modulated by the reflection image display elements 107-R, 107-G, and 107-B.

The illumination optical system 100a includes a white light source 101, a trimming filter 102 as the wavelength regulation element, a polarizing plate 103 as the polarizing selection element, and a polarization control element 104.

In this embodiment, as the light source 101, used was a 120 W UHP lamp (high pressure mercury lamp) of Phillips Corp. having an arc length of 1.4 mm. A halogen lamp, a xenon lamp, and a metal halide lamp may also be used as the light source 101.

A light beam emitted from the light source 101 is roughly collimated by a parabolic mirror 100a and then incident via the trimming filter 102 on the polarizing plate 103. The polarizing plate 103 transmits only a light component in the direction vertical to the plane of the figure, and the transmitted linearly polarized light beam is incident on the polarization control element 104.

The polarization control element 104 that has characteristics as shown in FIG. 2 rotates the polarization direction of only the B light component in the direction parallel to the plane of the figure and outputs the resultant light beam to the PBS 105.

Figure 3:
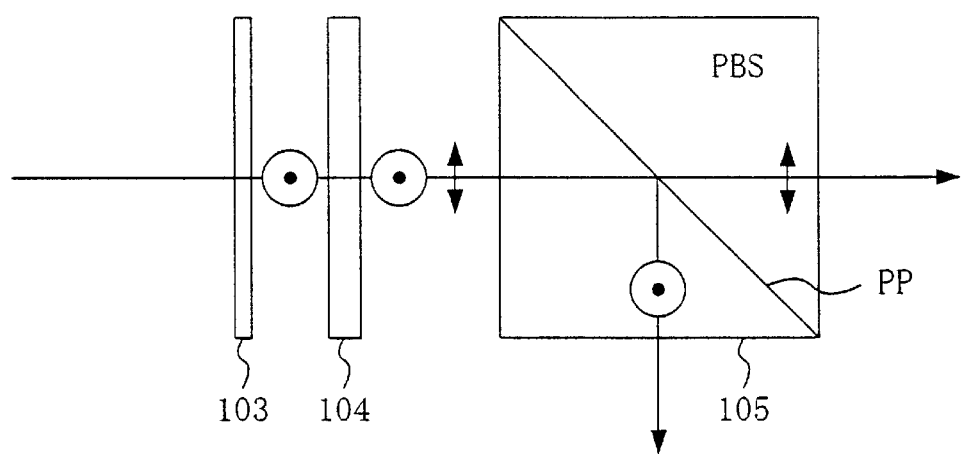
FIG. 3 shows an optical system used for measurement of the spectral characteristics of the polarization control element.

In FIG. 2, the solid line and the dashed line respectively represent the characteristics of the light beam reflected and transmitted by a beam splitting plane PP of the PBS 105 in the optical system shown in FIG. 3.

Figure 4:
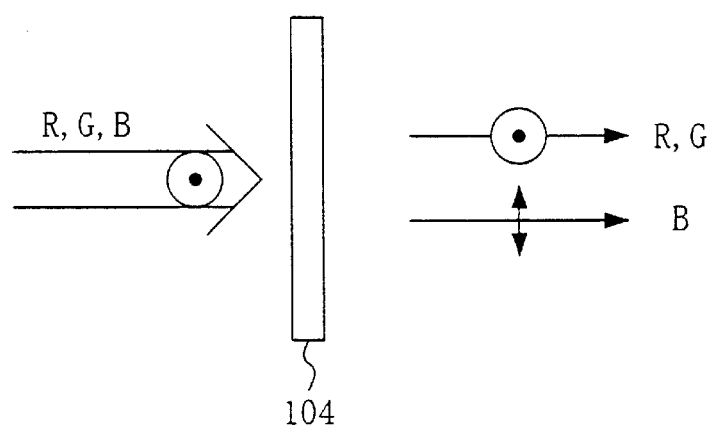
FIG. 4 is an illustration of a function of the polarization control element.

In this embodiment, used as the polarization control element 104 was an element of the type disclosed in U.S. Pat. No. 5,751,384. That is, the element is made of a plurality of wave plates stacked on each other having axes with different angles, and has a function capable of rotating the polarization direction of only a light component in a specific wavelength range. In this example, the element can rotate the polarization direction of the B polarized light component. In this case, as shown in FIG. 4, once a white linear polarized light beam is incident on the element 104, only the polarization direction of the B light component can be rotated while the polarization directions of the R and G light beams are kept unchanged.

An element other than that described above may also be used as the polarization control element 104 as long as the function described above can be provided. For example, a cholesteric liquid crystal material may be used.

The trimming filter 102 has functions of cutting a wavelength range at the boundary between the B light component of which polarization direction is to be rotated by the polarization control element 104 and the G light component of which polarization direction is not rotated, and cutting a wavelength range at the boundary between the R and G light beams (570 to 590 nm), as shown by the hatched portions in FIG. 2.

When the light beam output from the polarization control element 104 is incident on the PBS 105, the R and G light components that are s-polarized light with respect to the PBS 105 are reflected from the beam splitting plane PP, while the B light component that is p-polarized light passes through the beam splitting plane PP.

The light beam of R and G light components reflected from the PBS 105 is incident on the dichroic mirror 106 placed roughly in parallel with the beam splitting plane PP of the PBS 105, where the R light component is reflected while the G light component is transmitted. The roughly parallel placement of the color separation plane CP of the dichroic mirror 106 with the beam splitting plane PP minimizes disturbance in polarization state on the color separation plane CP as described above and thus improves the contrast ratio.

The R, G, and B light beams reflected/transmitted by the PBS 105 and/or the dichroic mirror 106 are then incident on the corresponding reflection image display element 107-R, 107-G, and 107-B for being modulated in accordance with image signals. The modulated R and G light beams are then incident on the dichroic mirror 106 again, combined again, and reflected toward the PBS 105. Likewise, the modulated B light beam is reflected toward the PBS 105. The PBS 105 selectively outputs toward the projection lens 108 only the light components of which polarization directions have been modulated. In this occasion, the PBS 105 functions as the polarized light combination element or the color combination element.

As the reflection image display elements 107, used are 0.9 Type XGA panels of a vertical orientation liquid crystal mode. Any other liquid crystal display devices such as those of the TN mode can also be used.

The dichroic mirror 106 is constructed as shown in FIG. 5. That is, the glass substrates 106a and 106b are optically bonded together with the dielectric color separation plane CP sandwiched therebetween. With this construction, when the R and G light beams that had been color-separated by the dichroic mirror 106 and reflected from the reflection image display elements 107-R and 107-G are to be color-combined by the dichroic mirror 106, the optical path lengths of the R and G light beams inside the glass substrates are the same. As a result, the generated amounts of astigmatism are the same. Naturally, the same glass (parallel plate) should preferably be used as the glass substrates 106a and 106b. Note that the color separation plate CP of the dichroic mirror 106 also functions as the color combination plane as described above.

In the dichroic mirror 106 with the above construction, the incident angle of the light beam with respect to the color separation plane CP changes depending on the refraction of the light beam in the glass substrates 106a and 106b, exhibiting a state similar to that exhibited when the angle of the positioning of the dichroic mirror 106 is changed. This change amount is however only 20° or less, which is not so influential as to substantially lower the contrast ratio. It is however preferable to set the incident angle with respect to the color separation plane CP at 20° or less in consideration of the light refraction in the glass substrates 106a and 106b.

The B light beam reflected from the reflection image display element 107-B is incident on the PBS 105 via the transparent glass substrate 109. The thickness of the transparent glass substrate 109 should be the same as that of the dichroic mirror 106 (total thickness of the glass substrates 106a and 106b) so that the R, G, and B light beams have the same amount of astigmatism. Naturally, the angle of the positioning of the transparent glass substrate 109 with respect to the optical path should preferably be the same as that of the dichroic mirror 106. Other constructions may also be used as long as the same amount of the astigmatism is obtained for the R, G, and B light beams.

The projection lens 108 is designed to compensate (correct) the astigmatism. As described above, the amounts of astigmatism for the R, G, and B color light beams are made equal to one another by using the color separator having the color separation plane sandwiched between the substrates and placing the transparent substrate having the same thickness as the color separator on the optical path to the reflection image display element where no color separator is required. Therefore, the astigmatism can be compensated only by changing the design of the projection lens 108.

The dichroic mirror 106 is not necessarily of the sandwich structure as in this embodiment. Depending on the resolution required, the conventional type of dichroic mirror where the color separation plane is formed on a surface of a glass plate may also be used. In this case, the reflection image display element 107-G for the G light beam that is most influential on the resolution is preferably placed on the optical path free of generation of astigmatism. Alternatively, the projection lens is preferably designed so as to correct astigmatism generated at the reflection image display element 107-G. The transparent glass substrate 109 may not necessarily be placed depending on the resolution required.

Between the PBS 105 and the projection lens 108, placed are: a polarization control element 110 having the same characteristics as the polarization control element 104; and a polarizing plate 111 that transmits a polarized light beam in the direction parallel to the plane of the figure.

The polarization control element 110 placed on the side of the PBS 105 facing the projection lens 108 serves to rotate the polarization direction of only the B light component, to equalize the polarization directions of the R, G, and B light components. As the polarization control element 110, the element described above in relation with the polarization control element 104 can be used. The polarizing plate 111 interposed between the polarization control element 110 and the projection lens 108 serves to cut a leak light component of the light beam output from the polarization control element 110 that should have been cut by the PBS 105, so as to improve the contrast ratio. In this way, the R, G, and B light components to be projected via the projection lens 108 for display are made to have the same polarization. When the resultant light beam is projected on a polarization screen, the display contrast ratio improves.

Figure 6A:
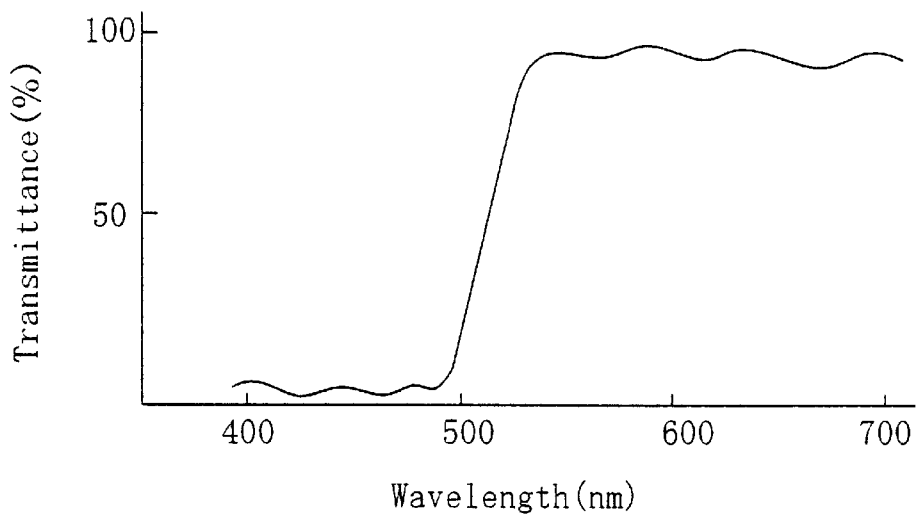
FIGS. 6A and 6B show the spectral characteristics of dichroic mirrors used in EMBODIMENT 1.
Figure 6B:
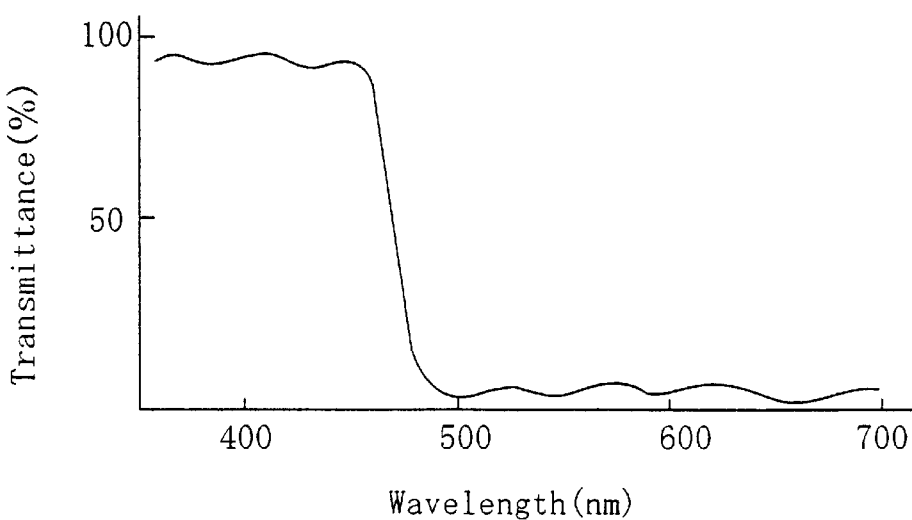

Dichroic mirrors 112 and 113 having the characteristics as shown in FIGS. 6A and 6B are inserted between the PBS 105 and the reflection image display elements 107-R and 107-G and between the PBS 105 and the reflection image display element 107-B, respectively. The dichroic mirrors 112 and 113 serve to cut light components other than those corresponding to the respective reflection image display elements 107-R, 107-G, and 107-B. Unwanted light components reflected from the dichroic mirrors 112 and 113 return toward the light source 101 via the PBS 105. FIG. 6A shows the spectral characteristics of the dichroic mirror 112 that selectively transmits the R and G light components, and FIG. 6B shows the spectral characteristics of the dichroic mirror 113 that selectively transmits the B light component.

In this embodiment, the dichroic mirror 112 is placed immediately downstream of the PBS 105. Alternatively, corresponding dichroic mirrors may be placed after the R and G light components are separated by the dichroic mirror 106. In this case, the dichroic mirror corresponding to the reflection image display element 107-R transmits only the R light component, while the dichroic mirror corresponding to the reflection image display element 107-G transmits only the G light component. Alternatively, either one of the dichroic mirrors may be placed depending on the characteristics of the PBS 105 and the polarization control device 104.

In this embodiment, the dichroic mirrors 112 and 113 were placed on the respective optical paths separated from the PBS 105. Alternatively, either one, or even none of the dichroic mirrors 112 and 113 may be placed depending on the characteristics of the PBS 105 and the polarization control device 104.

In this embodiment, the trimming filter 102 was provided for cutting the wavelength range at the boundary between the B and G light components and cutting the wavelength range at the boundary between the R and G light components. It is not necessarily required to cut both boundary wavelength ranges depending on the characteristics of the PBS 105 and the polarization control element 104 and also depending on the wavelength range used. The provision of the trimming filter 102 may not necessarily be required depending on the display performance required. The position of the trimming filter 102 may be anywhere on the optical path from the light source to the screen.

The resultant projector 100 having the above construction was a compact, low-cost liquid crystal projector capable of displaying markedly bright images with a high contrast.

In this embodiment, the polarization control elements 104 and 110 rotated the polarization direction of the B light component. Alternatively, the polarization direction of another color light component may be rotated, and the p and s-polarization of the color light components incident on the PBS 105 may be reversed.

In this embodiment, the white light beam was split into the R/G light beam and the B light beam. The combination may be changed to, for example, the G/B light beam and the R light beam. This change can be done only by changing the color light component of which polarization direction is rotated by the polarization control elements 104 and 110.

In this embodiment, the polarizing plates and the polarization control elements were placed on both the incident side and the outgoing side of the PBS 105. However, the polarization control element 110 and the polarizing plate 111 on the outgoing side are not necessarily required.

The display quality provided by the image display apparatus 100 shown in FIG. 1 can be further improved by modifying the construction as follows.

FIG. 7A schematically shows a layout of the optical elements in the periphery of the PBS 105 of the image display apparatus 100. FIG. 7B schematically shows a modification of the layout of FIG. 7A. In FIGS. 7A and 7B, the dichroic mirror 106 for color separation is omitted, and either one of the reflection image display elements 107-R and 107-G is shown under the reference numeral 107, for simplification. The reference numeral 107 is also used to refer to an arbitrary reflection image display element.

Consider that the dichroic mirrors 112 and 113 for wavelength regulation are placed between the PBS 105 and the corresponding reflection image display elements 107 as in the image display apparatus 100. As shown in FIG. 7A, for example, part of a light beam B(p) (p-polarized B light beam) that should have passed through the beam splitting plane PP of the PBS 105 is reflected from the beam splitting plane pp due to an insufficient distinction ratio of the PBS 105. The reflected light component is incident on the dichroic mirror 112. Such an unwanted reflected light component of the p-polarized B light beam B(p) is conveniently referred to as B(p)'.

The light component B(p)' is originally a light component that should pass through the light separation plane PP of the PBS 105 and incident on the reflection image display element 107-B as described above. Therefore, the light component B(p)' is not allowed to pass through the dichroic mirror 112 but returned to the PBS 105. Most of the returned light component B(p)' incident on the PBS 105 passes through the color separation plane PP of the PBS 105 and is incident on the projection lens (not shown in this figure), resulting in lowering the display contrast ratio.

Figure 8:
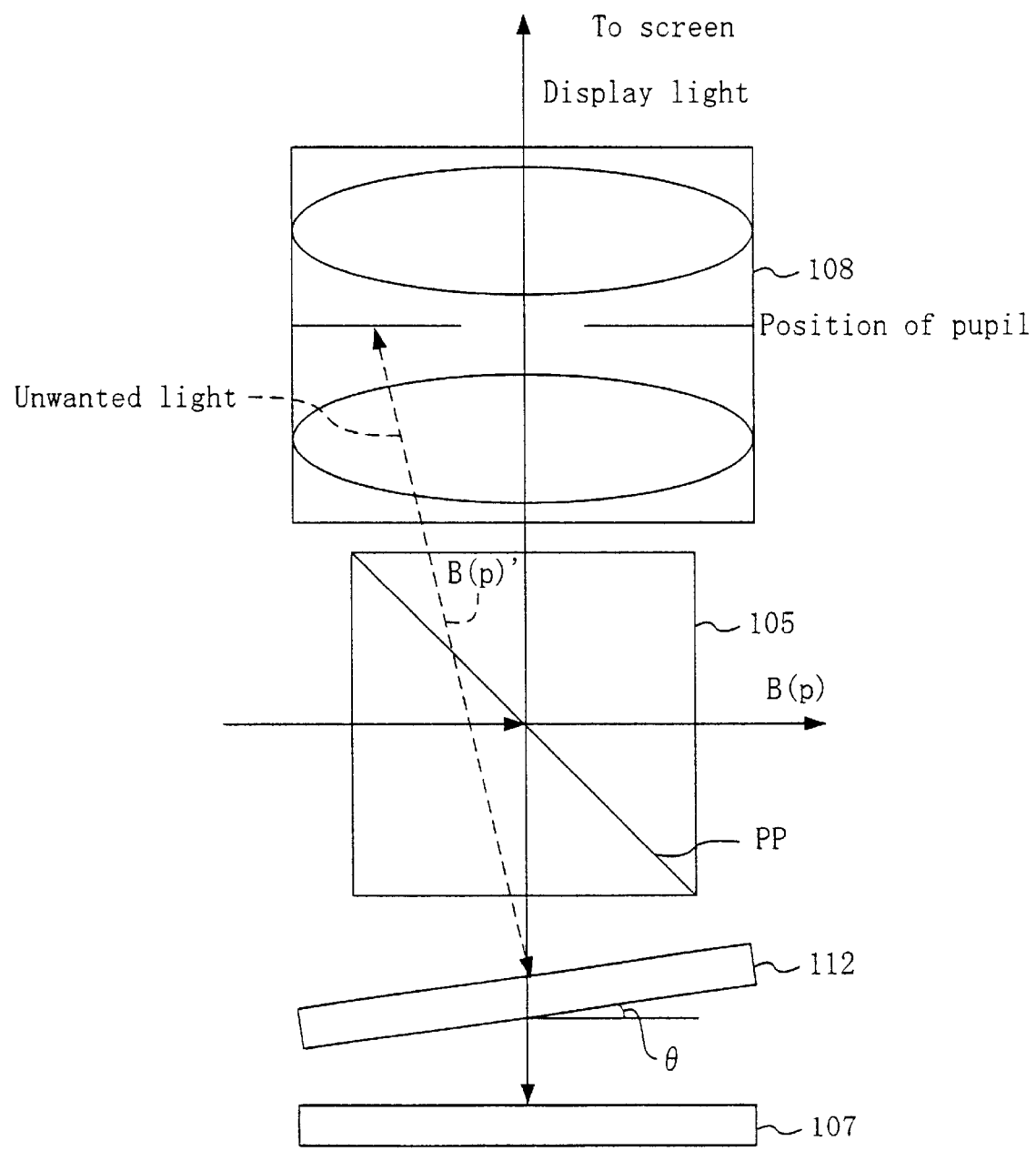
FIG. 8 is a schematic illustration of the effect of preventing lowering in contrast ratio by the layout shown in FIG. 7B.

In the layout shown in FIG. 7B, the light regulation planes of the dichroic mirrors 112 and 113 are positioned tilted with respect to the image display planes of the reflection image display elements 107. With this layout, the light component B(p)' reflected from the dichroic mirror 112 is incident on the PBS 105 at an angle different from the angle at which the light beam reflected from the reflection image display element 107 (the light beam used for display) is incident. This results in that, as schematically shown in FIG. 8, only the light component B(p)' that causes lowering of the contrast ratio fails to enter the pupil of the objection lens 108. In this way, lowering in contrast ratio due to incomplete color separation characteristics of the PBS 105 is prevented.

The acceptance angle of the projection lens 108 used for the projection image display apparatus is normally in the range of about 3° to 27° (F Nos. 1 to 8) though it varies depending on the size of the image display elements used. It is therefore possible to cut the unwanted light component B(p)' causing lowering of the contrast ratio in the following manner. Referring to FIG. 8, the angle θ of the wavelength regulation plate of the dichroic mirror 112 (typically a dielectric multilayer film) with respect to the image display plane of the reflection image display element 107 is adjusted in the range of about 1.5° to 13.5° in accordance with the acceptance angle of the projection lens 108 so that the unwanted light component B(p)' is incident on the projection lens 108 at an angle larger than the acceptance angle of the projection lens 108 as shown by the dashed line in the figure. In this way, the contrast ratio can be effectively improved. More precisely, when the wavelength regulation plane of the dichroic mirror 112 is tilted by the angle θ, the reflected light beam is tilted by the angle 2θ with respect to the incident light beam. Therefore, the acceptance angle of the projection lens must be 2θ or less. In consideration of this relationship, the angle θ of the wavelength regulation plane of the dichroic mirror 112 with respect to the image display plane of the reflection image display element 107 is adjusted in accordance with the acceptance angle of the projection lens.

Figure 9:
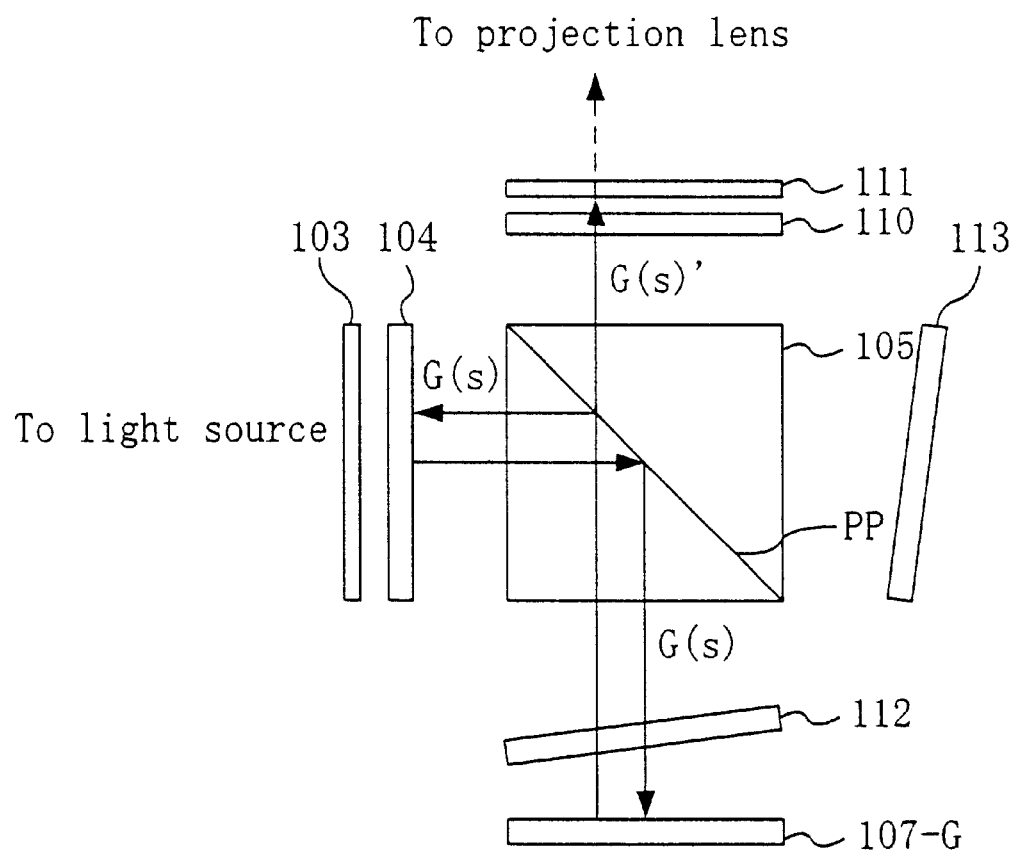
FIG. 9 is a schematic illustration of a mechanism of lowering in contrast ratio due to incomplete polarized beam splitting characteristics of the PBS.

Display quality may be lowered due to incomplete beam splitting characteristics of the PBS 105. This phenomenon will be described with reference to FIG. 9. FIG. 9 schematically shows a layout of the optical elements in the periphery of the PBS 105 of the image display apparatus 100. In FIG. 9, elements unnecessary for the following description are omitted for simplification.

As shown in FIG. 9, when a light beam G(s) (s-polarized G light beam) incident on the corresponding reflection image display element 107-G is reflected without being modulated by the reflection image display element 107-G (typically, when the reflection image display element 107-G is in the black display state), most of the light beam B(s) incident again on the PBS 105 is reflected by the beam splitting plane PP of the PBS 105 to return toward the light source (not shown in this figure). Due to an incomplete extinction ratio of the PBS 105, part of the light beam G(s) (denoted by G(s)') passes through the beam splitting plane PP. Most of such a light component G(s)' is cut by the polarizing plate 111. However, if the polarization control element 110 is placed between the PBS 105 and the polarizing plate 111, part of the light component G(s)' may be disturbed in polarization direction by the polarization control element 110, resulting in passing through the polarizing plate 111 and thereby lowering the display contrast ratio.

Figure 33:
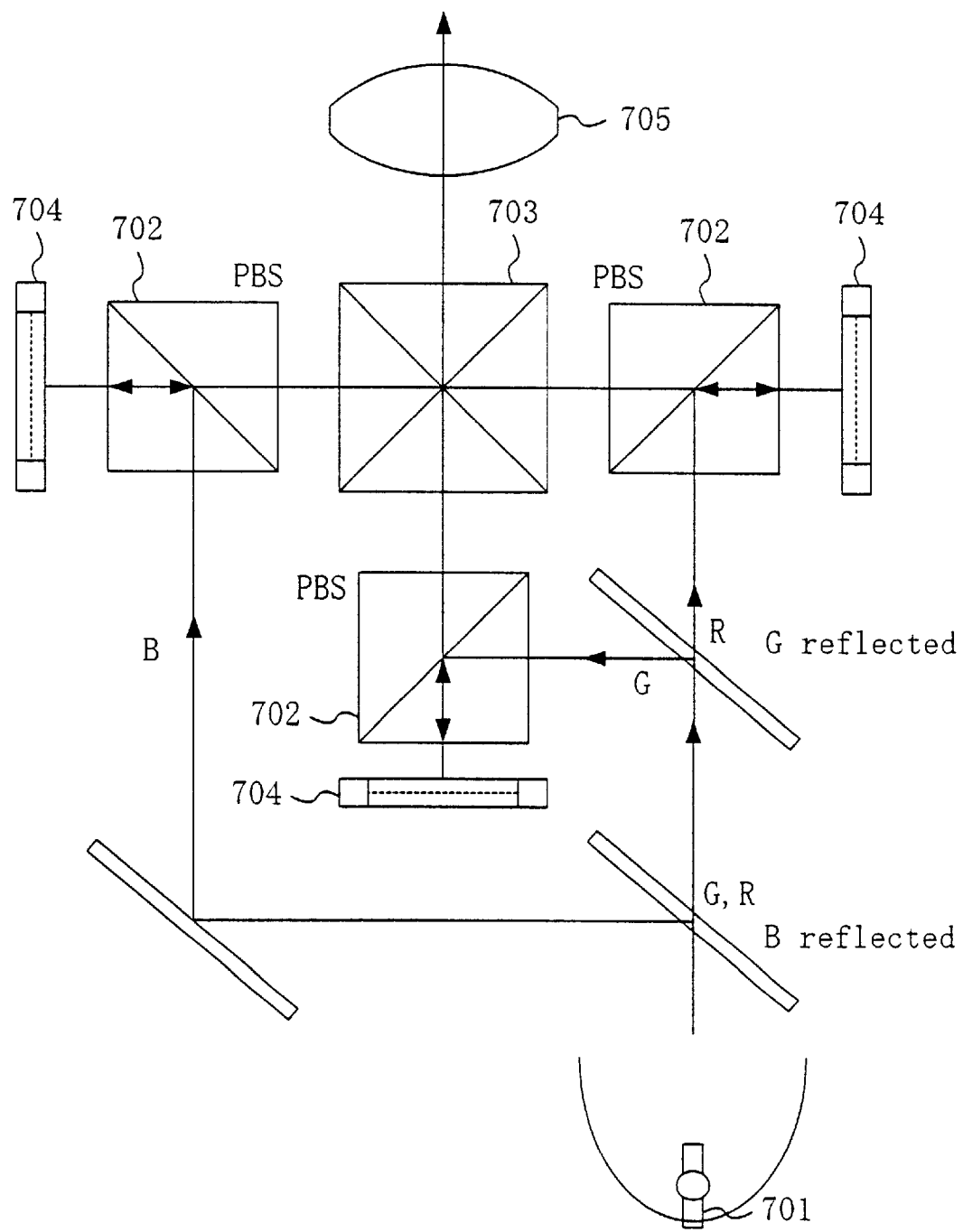
FIG. 33 is an illustration of a 3-panel type liquid crystal projector using reflection liquid crystal display elements.
Figure 34A:
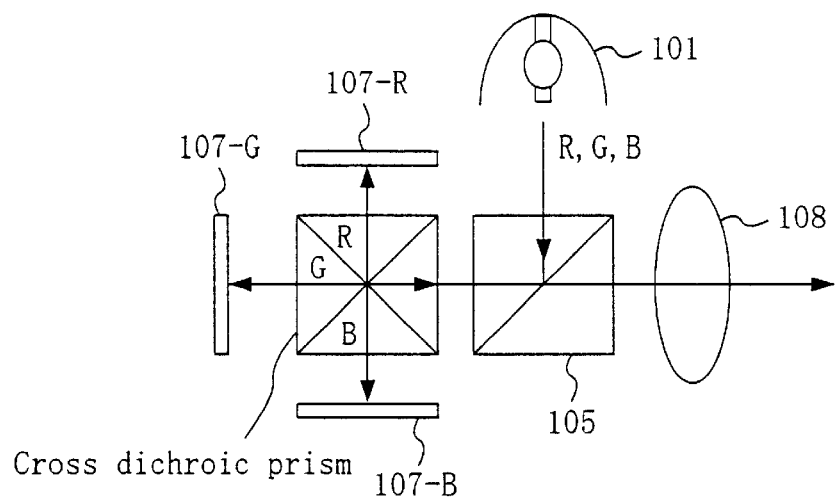
FIGS. 34A and 34B are illustrations of other 3-panel type liquid crystal projectors using reflection liquid crystal display elements.
Figure 34B:
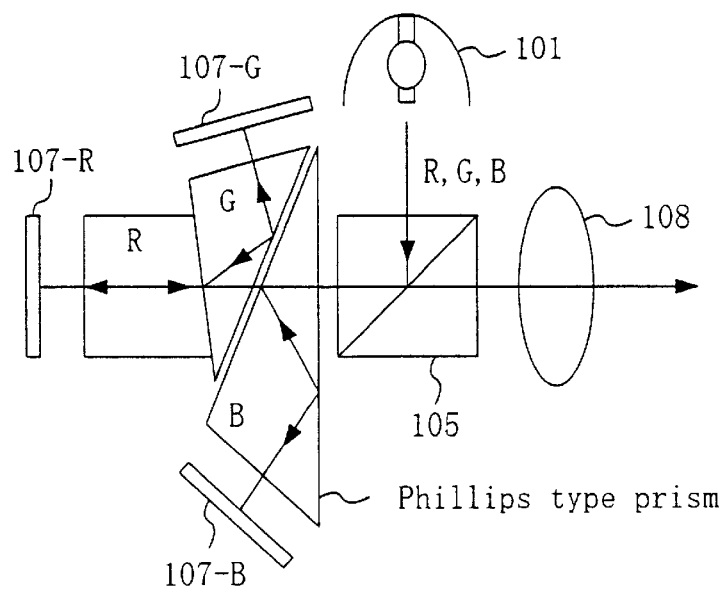
Figure 35:
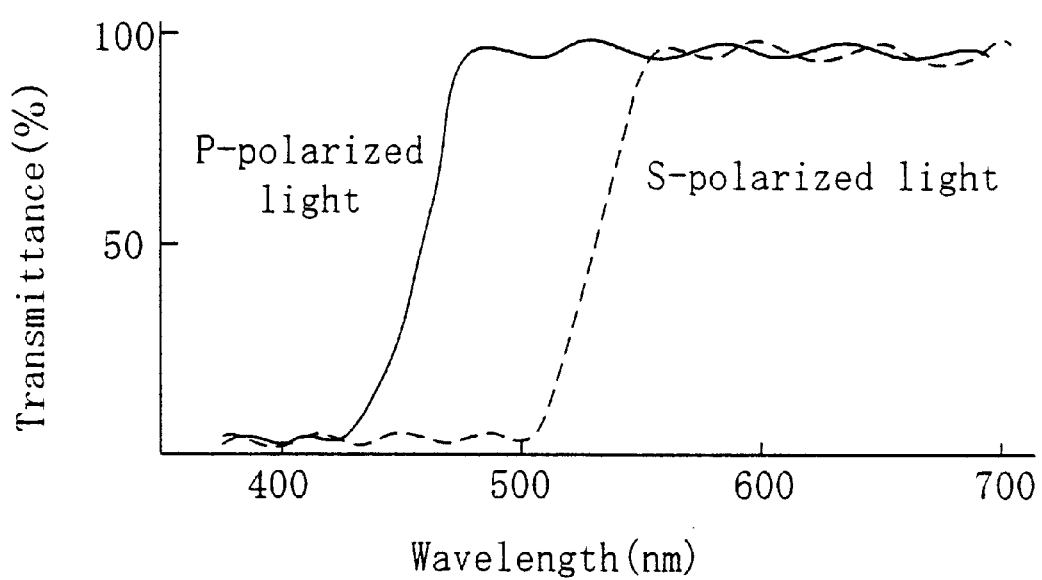
FIG. 35 shows the polarization dependence of a cross dichroic prism.

In the optical system shown in FIG. 33, an illumination light beam is first color-separated into R, G, and B light beams that are then allowed to be incident on the respective PBS 702. In the image display apparatus 100 of this embodiment, however, all the color light components are incident on the PBS 105. The PBS 105 is therefore required to have a high extinction ratio for all the wavelength ranges of the R, G, and B colors. It is however difficult to obtain such a PBS 105 that has a high extinction ratio for both p-polarized light and s-polarized light over a wide wavelength range. For example, if design is made to obtain a good characteristic (reflectance) for s-polarized light, the characteristic (transmittance) for p-polarized light lowers. In other words, the color separation characteristics as shown in FIG. 10 are obtained.

Figure 10:
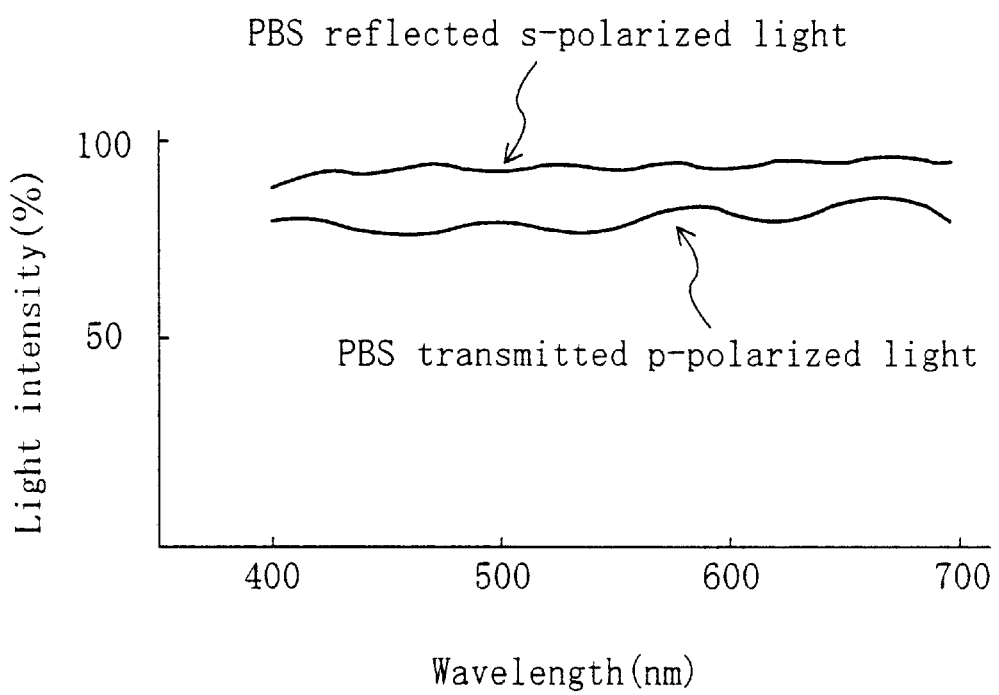
FIG. 10 is a graph showing the polarized beam splitting characteristics of the PBS used in the projection color image display apparatus of EMBODIMENT 1.

As is seen from FIG. 10, by using a PBS exhibiting a high characteristic for s-polarized light as the PBS 105 shown in FIG. 9, generation of the light component G(s)' can be reduced and thus the contrast ratio can be improved.

The polarized beam splitting characteristics of the PBS 105 may be optimized for either p-polarized light or s-polarized light. In general, in consideration of the fact that the polarized beam splitting characteristics for the non-optimized polarized light are lowered, it is more effective to optimize the polarized beam splitting characteristics of the PBS 105 for the polarized light on the side where a larger number of reflection image display elements (two or more elements since R, G, and B three panels are normally used) are placed, or for the polarized light on the side where the reflection image display element corresponding to the G light beam having a higher spectral luminous efficacy is placed.

Figure 11A:
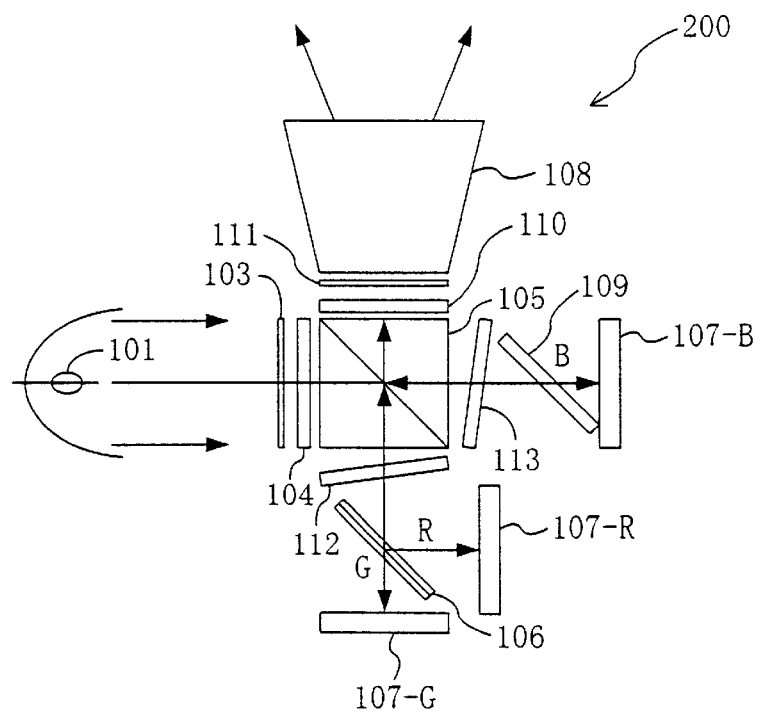
FIGS. 11A and 11B are schematic views of other projection color image display apparatuses of EMBODIMENT 1 of the present invention.
Figure 11B:
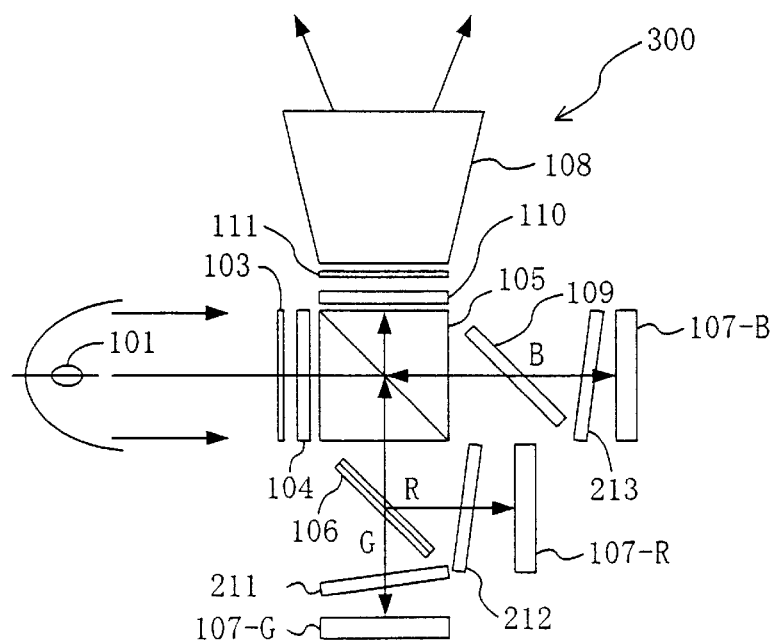

FIGS. 11A and 11B schematically show projection color image display apparatuses 200 and 300 where the above-described constructions are applied to the image display apparatus 100.

In the image display apparatus 200 of FIG. 11A, the dichroic mirrors 112 and 113 are placed at an angle of about 5° with respect to the display planes of the corresponding reflection image display elements 107 (i.e., the angle θ in FIG. 8 is about 5°). In the image display apparatus 300 of FIG. 11B, dichroic mirrors 211, 212, and 213 having substantially the same functions as the dichroic mirrors 112 and 113 are placed at an angle of about 5° with respect to the display planes of the corresponding reflection image display elements 107.

The image display apparatuses 200 and 300 use a lens of F No. 3.0 (acceptance angle: ±9.5°) as the projection lens 108, and an illumination light beam having a degree of collimation of ±10° with respect to the reflection image display elements 107 is incident.

By adopting the above constructions, even when an unwanted light component reflected from the dichroic mirror 112 or 113, or the dichroic mirror 211, 212, or 213 is output toward the objection lens 108 due to incomplete polarized beam splitting characteristics of the PBS 105, the unwanted light component fails to pass through the pupil of the projection lens 108 as shown by the dashed line in FIG. 8, thereby preventing lowering of the contrast ratio. Thus, the image display apparatuses 200 and 300 can realize display with a higher contrast ratio than that obtained by the image display apparatus 100.

In the image display apparatuses 200 and 300, the dichroic mirrors 112 and 113, and the dichroic mirrors 211, 212, and 213 were tilted so that all unwanted light components reflected from these dichroic mirrors can be cut by the projection lens 108. Alternatively, the tilt angle of the dichroic mirrors may be reduced to allow part of the unwanted light components to pass through the projection lens 108. This construction can still exhibit a higher contrast ratio than that of the image display apparatus 100.

In the image display apparatuses 200 and 300, the PBS 105 is better in the characteristic (reflectance) for s-polarized light than in the characteristic (transmittance) for p-polarized light as shown in FIG. 10. Therefore, the s-polarized light beam is reflected from the beam splitting plane PP of the PBS 105 in the better state than the transmittance of the p-polarized light beam, and incident on the two reflection image display elements 107-G and 107-R among the three reflection image display elements. The p-polarized light beam with poorer polarized beam splitting characteristics is incident only on the reflection image display element 107-B. In this way, by the maximum utilization of the polarized beam splitting characteristics of the PBS 105, a light component that may cause lowering of the contrast ratio can further be reduced.

In the image display apparatuses 200 and 300, the two reflection image display elements 107-G and 107-R were placed on the s-polarized light side of the PBS 105 for which the polarized beam splitting characteristics were optimized. Substantially the same effect may also be obtained by placing only the reflection image display element 107-G having a high spectral luminous efficacy on the s-polarized light side. If the polarized beam splitting characteristics of the PBS 105 are optimized for the p-polarized light, two reflection image display elements 107 may be placed on the p-polarized light side of the PBS 105. In this case, also, substantially the same effect may be obtained by placing only the reflection image display element 107-G having a high spectral luminous efficacy on the p-polarized light side.

In the image display apparatuses 200 and 300, the polarization direction of the B light beam was rotated by the polarization control element 104. Alternatively, the polarization directions of the R and G light beams may be rotated, and the p- and s-polarization of the light components incident on the PBS 105 may be reversed. The dichroic mirrors 112 and 113, and the dichroic mirrors 211, 212, and 213 were placed on both optical paths separated at the PBS 105. Depending on the characteristics of the PBS 105 and the polarization control element 104, the number of the dichroic mirrors may be reduced. The polarizing plates and the polarization control elements were placed on both the incident side and the outgoing side of the PBS 105. However, the polarization control element 110 and the polarizing plate 111 on the outgoing side are not necessarily required.

In the image display apparatuses 200 and 300, the dichroic mirror 106 was made of two glass substrates sandwiching the color separation plane therebetween. Depending on the resolution required, the dichroic mirror 106 is not necessarily of the sandwich structure, but the conventional color separator 106' (see FIG. 37, for example) where the color separation plane is formed on a surface of a glass substrate may be used.

Next, the construction and operation of the dichroic prism as the color separator will be described.

As described above, astigmatism occurs when the conventional dichroic mirror 106' having the color separation plane formed on a surface of a parallel plate is used as the color separator. It is therefore required to adopt special measures for compensating such astigmatism as described above (that is, use of the color separator 106 and the glass substrate 109).

In addition, the use of the color separator of a parallel plate such as the conventional dichroic mirror 106' causes generation of a so-called ghost phenomenon as shown in FIG. 12 where an image is doubled on a screen by the light (called "ghost light") reflected from the surface of a glass substrate 106*a*' opposite to the color separation plane CP.

Figure 13A:
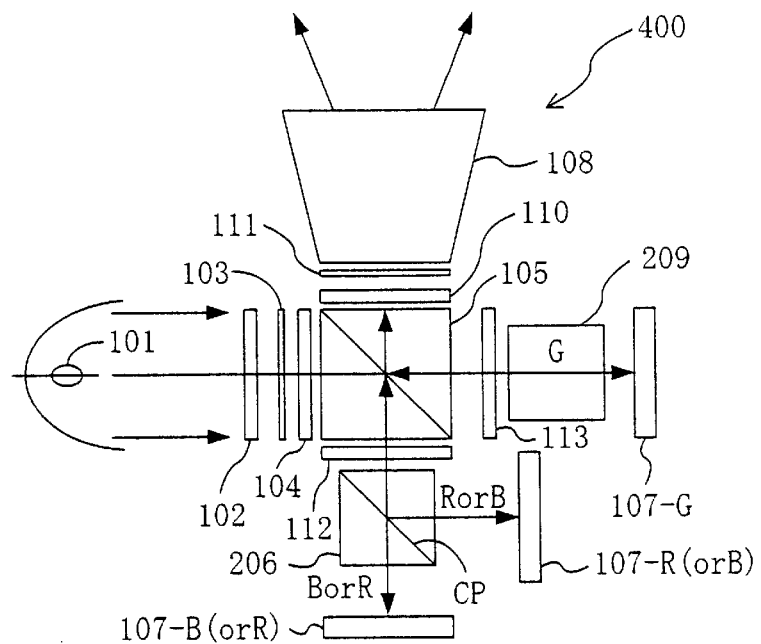
FIGS. 13A and 13B are schematic views of other projection color image display apparatuses of EMBODIMENT 1 of the present invention.
Figure 13B:
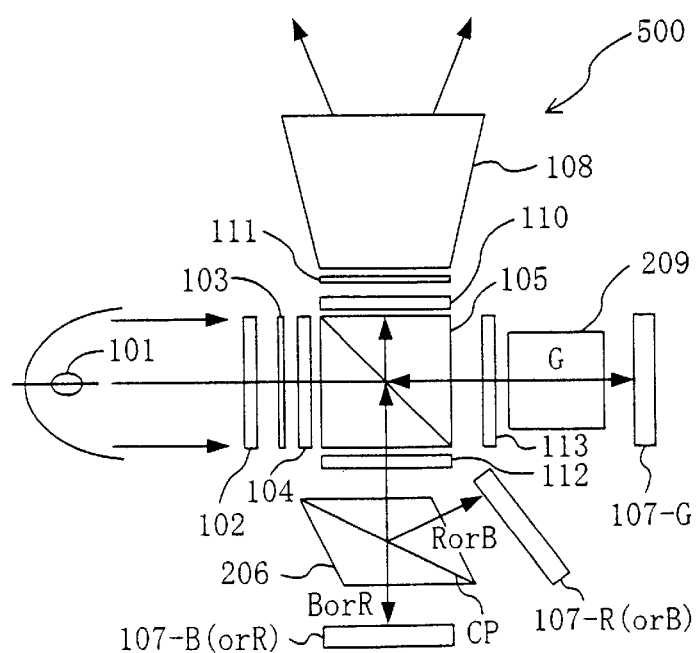

In order to solve the above problem, projection color image display apparatuses 400 and 500 shown in FIGS. 13A and 13B having a prism color separator (dichroic prism) 206 may be used. Since a prism does not generate astigmatism, the display quality can be improved without adopting special measures as in the image display apparatus 100 shown in FIG. 1. Typically, the dichroic prism 206 is a square pole prism made of two triangle pole prisms bonded to each other, with a dielectric multilayer film formed on the bonded interface serving as the color separation plane CP.

The use of the dichroic prism 206 is also advantageous in the following point. A light beam reflected from the reflection image display element may be partly reflected from the surface of the dichroic prism 206 when it is incident thereon. Such a reflected light component returns toward the reflection image display element, not toward a screen. This prevents the ghost phenomenon from being generated by the light beam reflected from the surface of the dichroic prism 206.

Since the dichroic prism 206 of the image display apparatus 400 is a square pole prism made of two right triangle pole prisms bonded to each other, the light incident angle with respect to the color separation plane CP is 45°, which is comparatively large thereby increasing the polarization dependence and lowering the color separation efficiency. This problem can be solved by the image display apparatus 500 shown in FIG. 13B of which the dichroic prism 206 is a parallelogram pole prism made of two isosceles triangle pole prisms having a dull vertical angle bonded to each other, for example. The incident angle with respect to the color separation plane CP of this dichroic prism is less than 45°. It is therefore possible to minimize the polarization dependence of the color separation characteristics. In the illustrated example, the dichroic prism 206 was constructed to have a light incident angle of 40°. As a result, the color separation efficiency successfully improved, and thus the brightness and the color purity improved.

As shown in FIGS. 13A and 13B, in the above cases of using a prism as the color separator, a glass block 209 is preferably placed on the optical path that does not include the dichroic prism 206 so as to equalize the optical path lengths for all the color light beams.

The construction of the image display apparatus using a dichroic prism as the color separator is not limited to the image display apparatuses 400 and 500, but can be realized by appropriately combining a prism with any of the aforementioned constructions. By using the dichroic prism in place of the dichroic mirror, the above effects of the dichroic prism can additionally be obtained.

Figure 14:
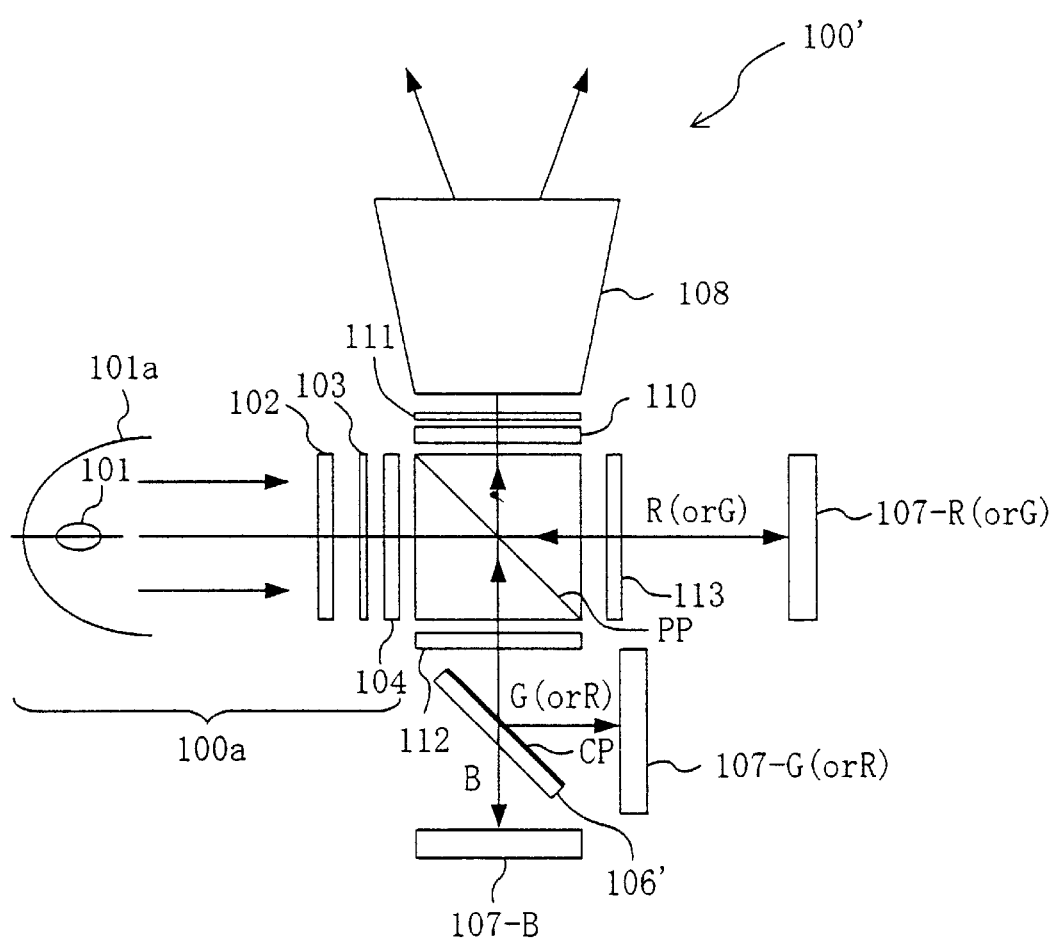
FIG. 14 is a schematic view of still another projection color image display apparatus of EMBODIMENT 1 of the present invention.

As described above, it is preferable to use the dichroic mirror 106 of the sandwich structure or the dichroic prism 206 as the color separator. It is however possible to use the conventional dichroic mirror 106'. FIG. 14 schematically shows another projection color image display apparatus 100' of this embodiment using the dichroic mirror 106'.

In the image display apparatus 100' shown in FIG. 14, the conventional dichroic mirror 106' having the color separation plane CP on a surface of a glass substrate is used in place of the sandwich-type dichroic mirror 106 in the image display apparatus 100 shown in FIG. 1. The dichroic mirror 106' is positioned so that the color separation plane CP thereof faces the PBS 105, and is constructed so as to transmit the B light beam. With this construction of the dichroic mirror 106', the G or R light beam is reflected from the exposed color separation plane CP, which prevents astigmatism from being generated for this light beam. Therefore, in this case, the transparent substrate 109 placed in the image display apparatus 100 of FIG. 1 is not provided.

Astigmatism is generated for the B light beam in the image display apparatus 100'. However, this astigmatism little influences the resolution of an image projected on the screen for the following reasons. For the human eyes, the spectral luminous efficacy of the B light beam is lower than those of the R and G light beams. Therefore, the resolutions of R and G images are dominant in the resolution of the projected image.

Moreover, the ghost phenomenon is minimized to such a degree that is hardly recognized visually by adopting the above construction of the dichroic mirror 106', that is, by positioning the color separation plane CP to face the PBS 105 and allowing the B light beam having the lowest spectral luminous efficacy to pass through the color separation plane CP.

In the layout shown in FIG. 14, the light beam reflected from the reflection image display element 107-R (or 107-G) is directly reflected from the color separation plane CP, generating no ghost. The light beam reflected from the reflection image display element 107-B is partly reflected from the surface of the transparent substrate opposite to the color separation plane CP, but the reflected light beam is not incident on the projection lens. Most of the B light beam incident on the color separation plane CP passes through the color separation plane CP. Due to the characteristics of the color separation plane CP, part of the B light beam is reflected from the color separation plane CP, and part of this reflected light component is reflected again from the surface of the transparent substrate opposite to the color separation plane CP, generating ghost. This ghost is however extremely weak compared with ghost generated in the construction as shown in FIG. 12 where the color separation plane CP faces the reflection image display element 107. The above construction that the color separation plane CP transmits the B light beam having the lowest spectral luminous efficacy is preferable for minimizing generation of ghost. However, a construction of transmitting another color light beam is still more effective in minimizing generation of ghost than the construction shown in FIG. 12.

Although the effect is lower than the construction of transmitting the B light beam, the construction that the dichroic mirror 106' transmits the R light beam having the second lowest spectral luminous efficacy may be adopted depending on the image quality required.

In the image display apparatus 100', the B and G light beams were reflected from the PBS 105. Alternatively, the B and R light beams may be reflected. Otherwise, the B and G light beams or the B and R light beams may be allowed to pass through the PBS 105.

Thus, as described above, generation of ghost can be minimized by placing the conventional dichroic mirror 106' so that the color separation plane CP formed on one surface of the transparent substrate faces the PBS 105. The generation of ghost can further be minimized by constructing the dichroic mirror 106' so as to transmit the B light beam having the lowest spectral luminous efficacy. This construction also minimizes lowering in resolution due to astigmatism.

Thus, according to EMBODIMENT 1 of the present invention, one of the R, G, and B light components incident on the PBS may be changed in polarization direction from others, so as to effect color separation by use of the PBS and the dichroic mirror. This makes it possible to realize a compact, lowcost image display apparatus (liquid crystal projector, for example).

The G light may be designated as one of the two color light components having the same polarization direction among the R, G, and B light components. This widens the usable light wavelength range, and thus increases the brightness and the color purity.

The dichroic mirror for color separation may have a structure of sandwiching the color separation plane by glass substrates, and a transparent substrate may be placed on the optical path that does not require color separation. With this construction, the amounts of astigmatism generated for all the reflection image display elements are the same, which can be corrected by the projection lens. As a result, a high-resolution image is realized.

The wavelength regulation element may be provided for cutting a light component in the wavelength range where both s-polarized light and p-polarized light exist and a light beam other than that corresponding to the respective reflection image display element. This improves the color purity and the contrast of the R, G, and B colors.

The wavelength regulation plane of the wavelength regulation element may be tilted with respect to the image display plane of the reflection image display element. This further improves the contrast ratio.

The use of the prism color separator further improves the display quality.

The beam splitter of which polarized beam splitting characteristics is optimized for either s-polarized light or p-polarized light may be used. With this beam splitter, the G light beam may be separated as the optimized polarized light, or two or more reflection image display elements may be placed so as to correspond to the optimized polarized light. By these constructions, the display quality can further be improved.

EMBODIMENT 2

An illumination optical system of an image display apparatus of EMBODIMENT 2 of the present invention divides a light beam of red, green, and blue three primary colors into two color light groups, sequentially switches the two color light groups in a time-division manner, and outputs the resultant light beam after changing the polarization direction of two of the three primary color light components to be different from the polarization direction of the other one color light component. The resultant light beam output from the illumination optical system is incident on a beam splitter (also called a polarization beam splitter), which splits the light beam according to the polarization direction. The split light beams are modulated by a plurality of reflection image display elements, and the modulated light beams are projected by a projection optical system for display.

The image display apparatus of this embodiment with the above construction is advantageous in the following points. In the conventional display apparatus of this type that displays each one of the R, G, and B colors in a time-division manner, the brightness reduces to one third of that of the apparatus using three image display elements. In this embodiment using two different color light groups including two of the R, G, and B colors, two of the three primary colors are always used. This dramatically improves the brightness without increasing the size of the system.

In this method, two different color light groups including two colors are sequentially switched for display as described above. This causes color breaking between the two color light groups. In this case, however, it is not that the respective primary colors are observed separately from one another as in the conventional case, but that two colors are recognized separately. Since each color light group includes two of the R, G, and B colors, it appears to human eyes that the color breaking has been markedly improved.

The illumination optical system may include: a light source for emitting a light beam of the three primary colors; a color switch element for sequentially switching two different color light groups each including two of the three primary color light components emitted from the light source; and a first polarization control element for changing the polarization direction of the color light component commonly included in the two different color light groups or the polarization direction of two color light components other than the above common color light component. This construction enables a predetermined color light beam to be efficiently incident on a corresponding reflection image display element, and thus further improves the brightness.

Figure 16A:
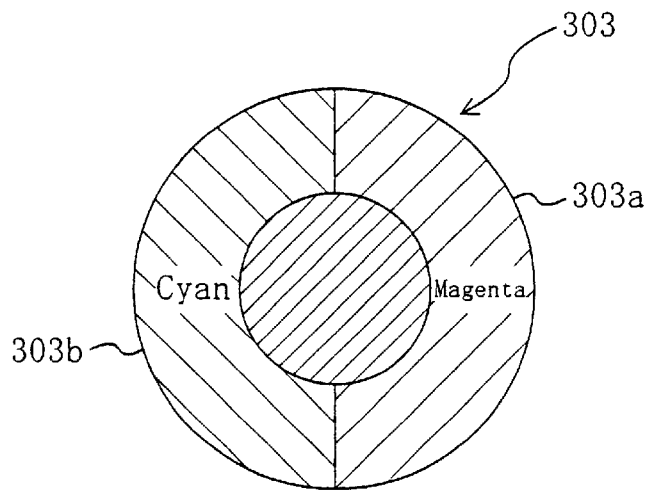
FIGS. 16A and 16B are illustrations of rotary color filters used in EMBODIMENT 2.
Figure 39:
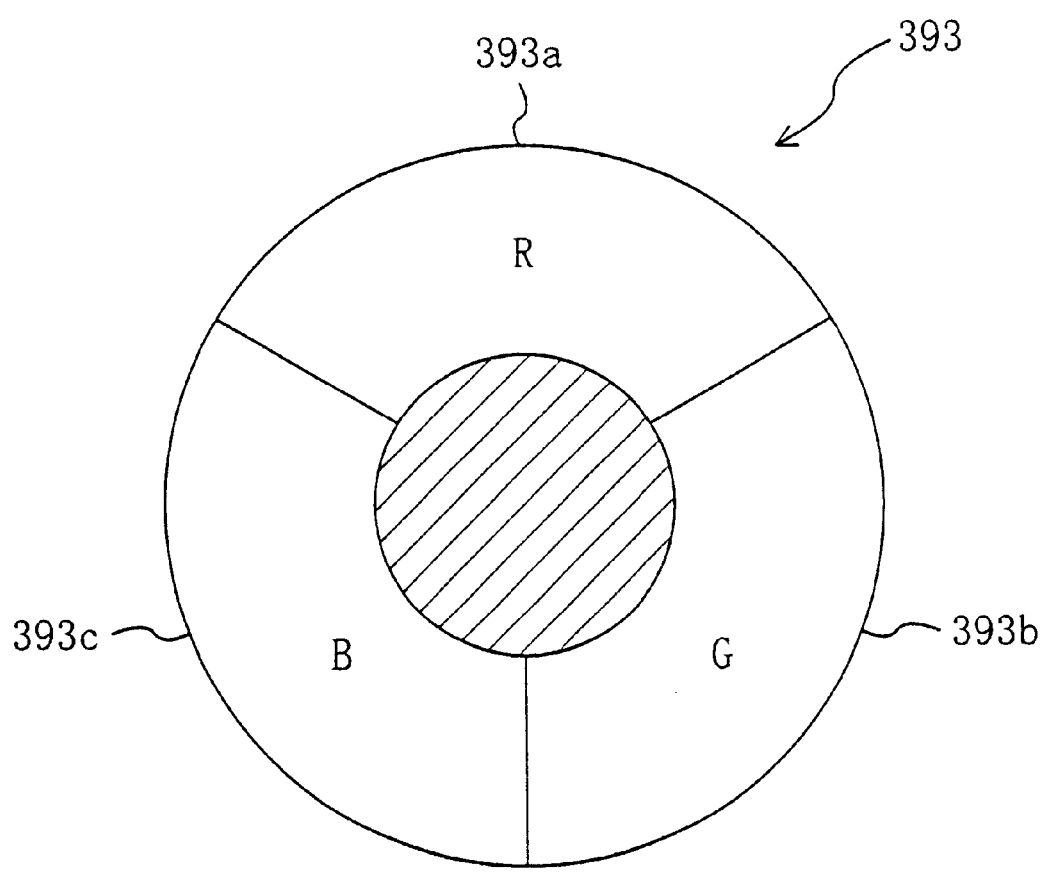
FIG. 39 is an illustration of a conventional rotary color filter.

In the conventional method using the rotary color filter 393 shown in FIG. 39, the filter is divided into three regions (393a, 393b, and 393c) for transmitting the R, G, and B light components. In the method of this embodiment, however, as shown in FIG. 16A, a rotary color filter 303 is divided into two regions 303a and 303b for two different color light groups (for example, magenta and cyan). This relieves the response speed requirement for the reflection image display elements 1.5 times compared with the case of the conventional method shown in FIG. 39 theoretically. Moreover, since the common color light component included in the two color light groups is always incident on one reflection image display element, the response speed requirement for the reflection image display element corresponding to this color light component is the same as that in the case of the conventional 3-panel type projector. That is, the brightness improves three-fold compared with the conventional field sequential type projector.

As the first polarization control element, an element similar to that described in EMBODIMENT 1 may be used. For example, the element disclosed in U.S. Pat. No. 5,751,384 may be used.

Alternatively, the illumination optical system may include: a light source for emitting a light beam of the three primary colors; a color switch element for sequentially switching a color light group including two of the three primary color light components emitted from the light source and the other color light component in a time-division manner; and a first polarization control element for changing the polarization direction of one of the two color light components included in the color light group or the polarization direction of the other color light component. In this construction, every time the color switch element switches the color light beam to be incident on the beam splitter, the resultant color light beam is incident and is not incident, alternately, on the corresponding reflection image display element. The duration when the color light beam is not incident on the corresponding reflection image display element may be utilized to write an image signal in the reflection image display element. Once the color light beam is incident, the polarization direction thereof can be modulated according to the written image signal.

In the conventional field sequential method using a liquid crystal panel, for example, use of light is prohibited during the period from the application of an electric field to a liquid crystal material until complete response of liquid crystal molecules (liquid crystal response time) (hereinafter, this period is referred to as a blanking time). In this embodiment, since it is possible to write an image signal during the light non-incident duration as described above, such blanking time can be eliminated. This further improves the light utilization efficiency.

A second polarization control element having substantially the same function as the first polarization control element may be provided on the side of the beam splitter closer to the projection optical system, for equalizing the polarization directions of the light beams having different polarization directions. By equalizing the polarization direction, a polarization screen can be used for projection of the display light. This enables display of an image with a high contrast ratio even under bright illumination. The polarization screen has a polarizing plate bonded to the screen surface for cutting a half of incident random polarized light. The polarization screen may be arranged so that the transmission axis of the polarizing plate matches with the polarization direction of the light beam output from the projector. By this arrangement, while incident light from the projector is little cut, influence of external light is halved. Thus, a high contrast ratio can be maintained.

A polarization selection element may further be placed on an optical path on the light incident side of the first polarization control element. The polarization selection element transmits only polarized light in one polarization direction. With this construction, a linearly polarized light beam is incident on the first polarization control element. As a result, color separation and/or polarized beam splitting can be efficiently done by the first polarization control element and the beam splitter, thereby allowing for display of a bright image with a high contrast ratio.

A polarization selection element may further be placed on an optical path on the light outgoing side of the second polarization control element. The polarization selection element transmits only polarized light in one polarization direction. With this arrangement, even if a light beam that should have been returned toward the light source by the beam splitter passes through the beam splitter, it is cut by the polarization selection element. This minimizes lowering in contrast ratio and thus realizes an image with a high contrast ratio.

The color switch element may be constructed so as to keep selecting one color light group for a longer time than the other color light group. That is, selected for a longer time is the group including a color light component having a lower intensity than the other of the two color light components other than the common color light component included in the two different color light groups. By this construction, the amount of light (color light) in a wavelength range having a low emission intensity can be relatively increased even in the case of using a light source having a non-uniform intensity distribution of emission spectrum (such as a metal halide lamp and a halogen lamp), for example. This improves white balance.

Conventionally, in AV projectors that put importance on white balance, adjustment of white balance is made by dimming color light having a high emission intensity, resulting in greatly reducing the brightness. The method of this embodiment is therefore very advantageous in the application to AV projectors since lowering in brightness can be minimized.

The green light component may be included only in one of the two different color light groups selected by the color switch element, and the color switch element may keep selecting the group including the green light component for a longer time than the other color light group. This increases the amount of the green light component that has a high spectral luminous efficacy and is greatly influential on the brightness, thereby improving the brightness of the resultant image. This may lead to tipping of white balance, which however will not cause a serious problem as long as the resultant projector is used for data projection that does not put importance on white balance.

The above color light selection method of the color switch element can also be applied to the case of selecting between the color light group including two of the three primary color light components and the other one color light component. That is, the color switch element may effect this selection so that the color light component having the lowest intensity among the three primary color light components is one included in the color light group or the other color light component whichever is kept selected for a longer time. By this construction, also, substantially the same function and effect are obtained.

The color switch element may select the R, G, and B primary color light components simultaneously for a predetermined period of time (for example, using a color filter having a transparent region). By this construction, the brightness improves when white display is made on the screen.

The image display apparatus of this embodiment may use two reflection image display elements so that one of the two elements corresponds to one of the three color light beams while the other element corresponds to the remaining two color light beams. With this construction, two color light beams can be used simultaneously, unlike the conventional method where the R, G, and B color light beams are sequentially displayed one after another. This drastically improves the brightness.

A wavelength regulation element (for example, a trimming filter) may be inserted anywhere on the optical path between the illumination optical system and the projection optical system. This makes it possible to block a color light component or a polarized light component having a polarization direction that should not be incident on the reflection image display element. This improves the color purity and prevents the contrast ratio from lowering.

Figure 26:
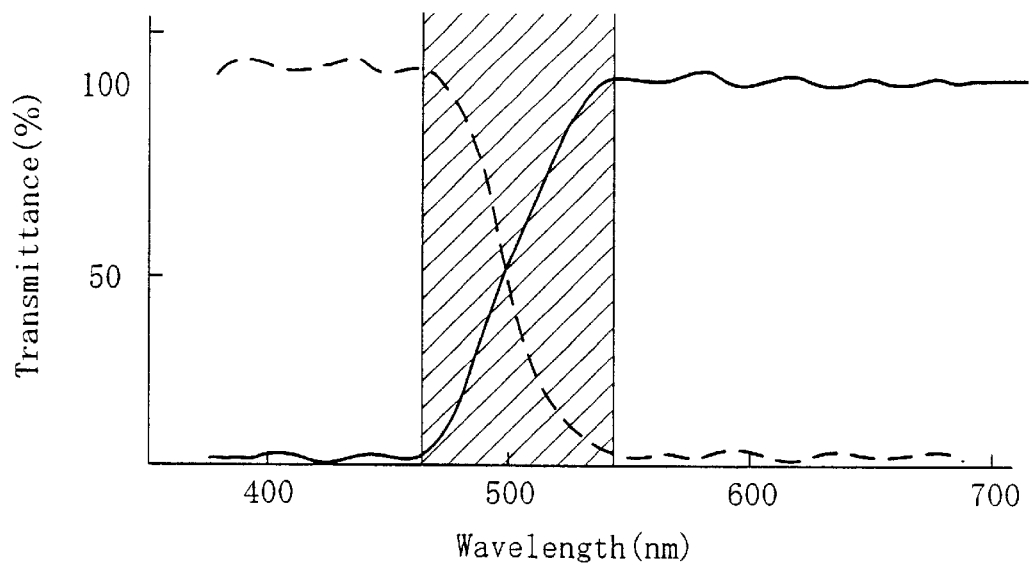
FIG. 26 shows the spectral characteristics of the polarization control element used in EMBODIMENT 1.

In reality, the polarization control element fails to completely control the polarization of the light beam. As shown in FIG. 26, the polarization of the R and G light components is partly disturbed, resulting in mixing with the B light component. Also, the polarization direction of the B light component is not completely rotated, resulting in partly mixing with the R and G light components. As a result, the polarization state is mixed in the boundary wavelength range.

The beam splitter also fails to completely split the light beam according to the polarization direction, similarly causing color mixture. Together with the mixture of the polarization direction, the contrast ratio lowers.

In consideration of the above, a wavelength regulation element may be placed between the beam splitter and each reflection image display element so as to transmit only the light component (color light component) in the wavelength range corresponding to the reflection image display element. This not only improves the color purity, but also prevents lowering in contrast ratio due to an unwanted light component. This effect may be obtained by placing the wavelength regulation element between the beam splitter and at least one of the reflection image display element. Preferably, however, the wavelength regulation element may be placed for each of the reflection image display elements.

The wavelength regulation element may be placed between the beam splitter and one of a plurality of reflection image display elements on which the common color light component included in the two different color light groups is incident, so as to selectively transmit the common color light component. By adopting this construction, the above advantages of improving the color purity and preventing lowering in contrast ratio due to an unwanted light component are effectively obtained without the necessity of inserting wavelength regulation elements for all the reflection image display elements.

There may also be provided a wavelength regulation element for cutting a light component in the wavelength range at the boundary between the light component of which polarization direction is changed by the polarization control element and another light component. This also improves the contrast ratio and the color purity.

Hereinafter, EMBODIMENT 2 of the present invention will be described concretely with reference to the accompanying drawings. In the following drawings, components having substantially the same functions as those of the image display apparatus of EMBODIMENT 1 are denoted by the same reference numerals.

Figure 15:
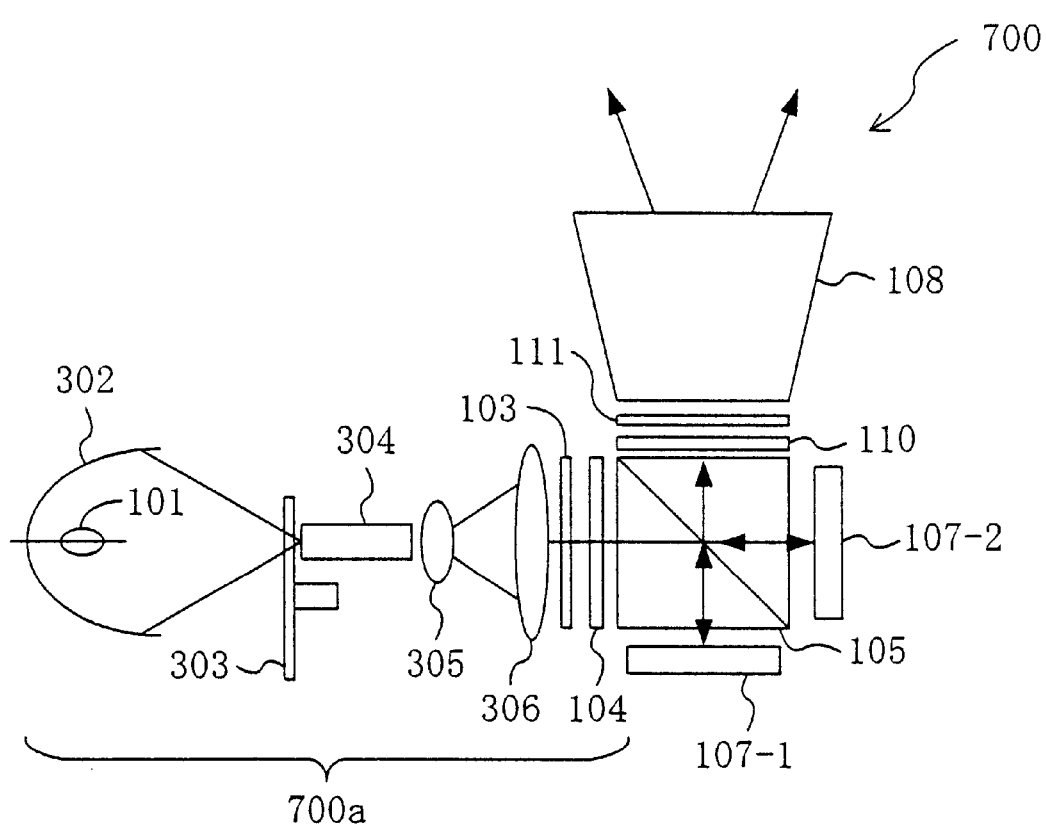
FIG. 15 is a schematic view of a projection color image display apparatus of EMBODIMENT 2 of the present invention.

FIG. 15 is a schematic view of a projection color image display apparatus 700 of EMBODIMENT 2 of the present invention.

The image display apparatus 700 includes an illumination optical system 700*a* that separates a light beam of the red, green, and blue three primary color light components into two color light groups, sequentially switches the two color light groups in a time-division manner, and outputs the resultant light beam after changing the polarization direction of two of the three primary color light components to be different from the polarization direction of the other one color light component. The image display apparatus 700 also includes: a PBS 105 as the beam splitter that splits the light beam output from the illumination optical system 700a according to the polarization direction; reflection image display elements 107-1 and 107-2 that modulate the split light beams from the PBS 105; and a projection optical system (projection lens) 108 that projects the light beams modulated by the reflection image display elements 107-1 and 107-2.

The illumination optical system 700a includes a white light source 101, a rotary color filter 303 as the color switch element, a polarizing plate 103 as the polarization selection element, and a polarization control element 104.

In EMBODIMENT 2, as the light source 101, used was a 120 W UHP lamp (high pressure mercury lamp) of Phillips Corp. having an arc length of 1.4 mm. A halogen lamp, a xenon lamp, and a metal halide lamp may also be used as the light source 101. The light source 101 is backed by an elliptic mirror 302 for converging light from the light source on the second focal point. In the vicinity of the second focal point of the elliptic mirror 302, placed is the rotary color filter 303 as shown in FIG. 16A. The rotary color filter 303 has regions 303a and 303b for transmitting a magenta (color including the B and R components) light component and a cyan (color including the B and G components) light component, respectively. A glass rod 304 is placed downstream (on the outgoing side) of the rotary color filter 303. The glass rod 304 permits the incident light to propagate therethrough by repeating reflection therein, and the light outgoing plane thereof is positioned so that the outgoing light is roughly focused on the reflection liquid crystal elements 107 to be described later.

Since the light beam repeats total internal reflection inside the glass rod 304, the illumination distribution of the light beam at the outgoing plane of the glass rod 304 is roughly uniform. This improves the illumination distribution of the light beam incident on the reflection liquid crystal display elements 107. The light beam output from the glass rod 304 is incident on an illumination lens 305 and then on a field lens 306, to be roughly collimated. The collimated light beam is incident on the polarizing plate 103, which allows only a light component in the direction vertical to the plane of the figure to pass therethrough and be incident on the polarization control element 104.

The polarization control element 104 has the characteristics as shown in FIG. 2 as described in EMBODIMENT 1. That is, the polarization control element 104 rotates the polarization direction of only the B light component of the incident light beam in the direction parallel to the plane of the figure and outputs the resultant light beam to the PBS 105. In FIG. 2, the solid line and the dashed line respectively represent the characteristics of the light beam reflected and transmitted by a beam splitting plane PP of the PBS 105 in the optical system shown in FIG. 3.

In this embodiment, as in EMBODIMENT 1, an element of the type disclosed in U.S. Pat. No. 5,751,384 was used as the polarization control element 104. Any other element may also be used as long as the function described above can be provided. For example, a cholesteric liquid crystal material may be used.

When the light beam output from the polarization control element 104 is incident on the PBS 105, the R and G light components are reflected since they are s-polarized with respect to the PBS 105 while the B light component is transmitted since it is p-polarized. The light beams split by the PBS 105 are incident on the corresponding reflection image display elements 107-1 and 107-2, where the light beams are modulated according to image signals and reflected toward the PBS 105. Only the light components of which polarization directions have been modulated are allowed to be incident on the projection optical system 108 and projected on a screen. As the reflection image display elements 107, used are 0.9 Type XGA panel liquid crystal display (LCD) devices using a nematic liquid crystal material having a response speed of 2 to 3 msec. Any other liquid crystal mode can also be used as long as the response speed is comparatively high such as a ferroelectric liquid crystal display material.

The period of the rotary color filter 303 having the cyan and magenta transmission regions is ⅟60 second. Therefore, the time allocated for each of the cyan and magenta regions is about 8 msec, meaning that the color switches every about 8 msec. The B light component that is commonly included in these two colors always passes through the PBS 105 irrespective of the rotation of the rotary color filter 303, to be incident on the reflection image display element 107-2. The remaining colors of magenta and cyan are R and G, respectively, which are sequentially switched at the above speed, to be incident on the reflection image display element 107-1. In this way, by one rotation of the rotary color filter 303, the R, G, and B light beams are modulated by the reflection image display elements 107.

Figure 16B:
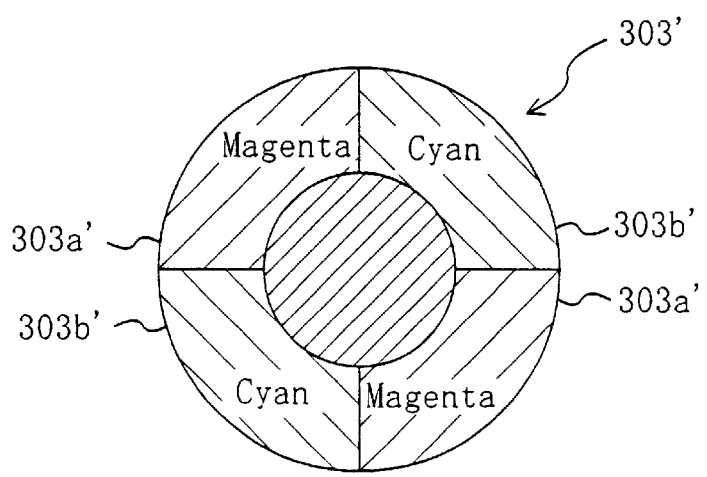

In this embodiment, the rotary color filter 303 rotated at a period of ⅟60 second. It may be rotated at a double or higher speed. In place of increasing the rotational speed of the rotary color filter 303, the number of division regions of the rotary color filter may be increased as shown in FIG. 16B, for example, where a rotary color filter 303' is divided into four regions (two magenta regions 303a' and two cyan regions 303b' alternately arranged). In this case, also, substantially the same effect is obtained.

A polarization control element 110 and a polarizing plate 111 are placed between the PBS 105 and the projection lens 108. The polarization control element 110 may be the same element as that used as the polarization control element 104, and serves to rotate the polarization direction of only the B light component, to equalize the polarization directions of the R, G, and B light components. The polarizing plate 111 serves to cut a leak light component of the light beam output from the polarization control element 110 that should have been cut by the PBS 105, so as to improve the contrast ratio. A projector with the above construction was actually prepared and tested. As a result, the brightness improved about 1.5 times compared with the conventional single-panel type projector of the field sequential method.

In this embodiment, the polarization control elements 104 and 110 rotated the polarization direction of the B light component. Alternatively, the polarization direction of the R and G light components may be rotated, and the p and s-polarization of the color light components incident on the PBS 105 may be reversed.

In this embodiment, the white light beam was split into the R/G light beam and the B light beam. The combination may be changed to, for example, the G/B light beam and the R light beam. This change can be done only by changing the color light component of which polarization direction is rotated by the polarization control elements 104 and 110.

In this embodiment, the polarizing plates and the polarization control elements were placed on both the incident side and the outgoing side of the PBS 105. However, the polarization control element 110 and the polarizing plate 111 on the outgoing side are not necessarily required.

Figure 17A:
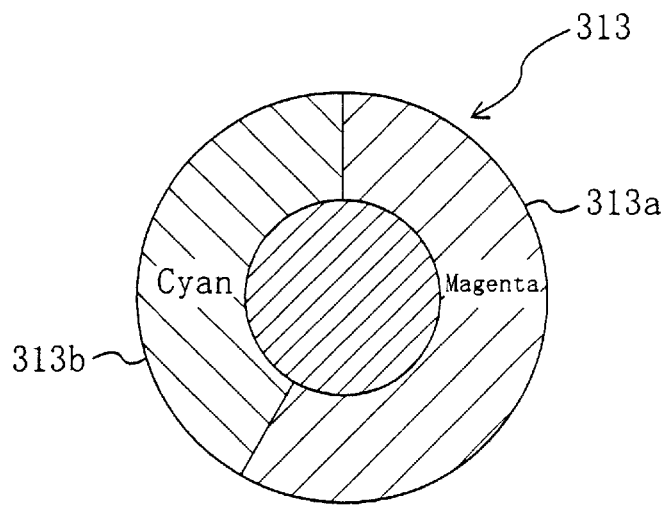
FIGS. 17A and 17B are illustrations of other rotary color filters used in EMBODIMENT 2.
Figure 17B:
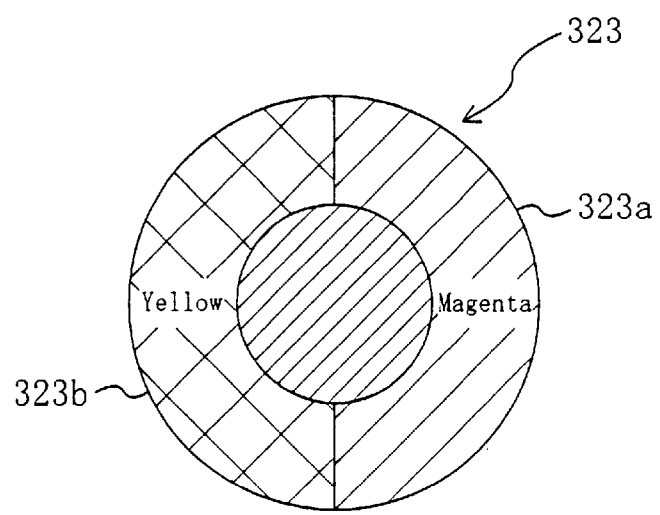
Figure 18:
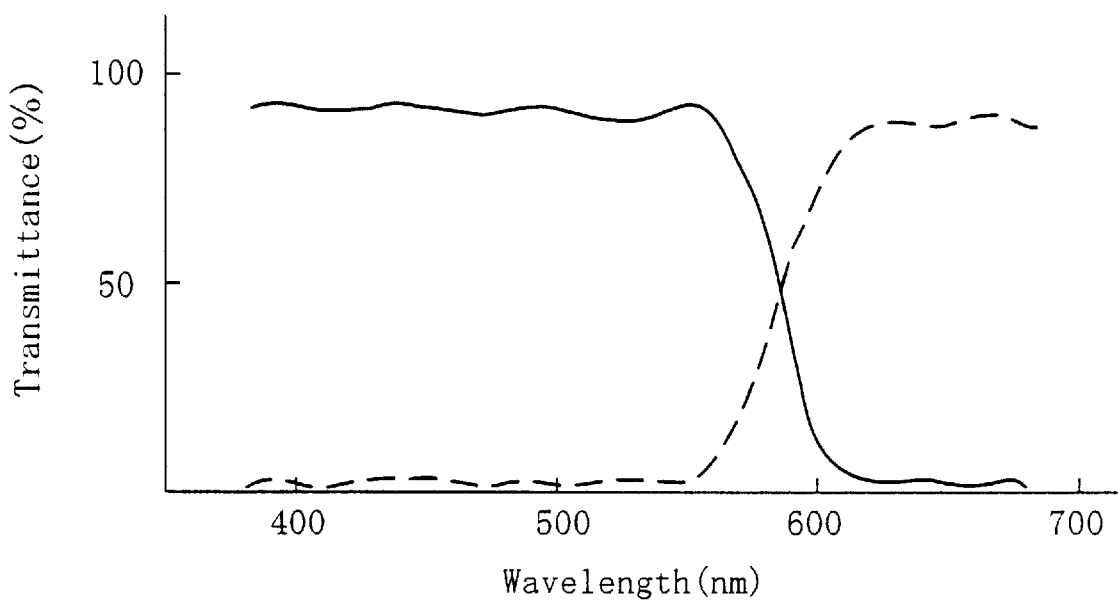
FIG. 18 shows the spectral characteristics of a polarization control element that rotates only a polarized light component in the red wavelength range.

Rotary color filters 313 and 323 shown in FIGS. 17A and 17B, respectively, may be used for the image display apparatus 700 in place of the rotary color filter 303. The rotary color filter 313 shown in FIG. 17A has a magenta region 313*a* larger than a cyan region 313*b* by about 10%. The rotary color filter 323 shown in FIG. 17B has a magenta region 323*a* and a yellow (color including R and G components) region 323*b*. In the case of the rotary color filter 323 using magenta and yellow, used as the polarization control elements 104 and 111 is a polarization control element that rotates the polarization direction of only the R light component, having the characteristics shown in FIG. 18. As the polarization control elements 104 and 111, an element that rotates the polarization direction of only the G or B light component may also be used.

In the rotary color filter 313 shown in FIG. 17A, the R-including magenta region is larger than that of the rotary color filters 303 and 303' shown in FIGS. 16A and 16B, respectively. A magenta light component is therefore kept selected for a longer time than a cyan light component. This means that the amount of the R light component that is lower in emission intensity can be substantially increased. The size of the magenta region may be appropriately changed depending on the intensity distribution of the emission spectrum of the light source used.

In the case of the rotary color filter 323 shown in FIG. 17B, R is commonly included in the magenta and yellow regions. Therefore, the R color component is always incident on the reflection image display element 107 irrespective of the area of the color region and the rotational speed of the rotary color filter 323. This substantially increases the amount of the R light component as in the case shown in FIG. 17A.

The UHP lamp of Phillips Corp. used in this embodiment is low in R emission intensity and poor in white balance. By using the rotary color filter 313 or 323 having the above characteristics, good white balance can be obtained. Projectors using the rotary color filters 313 and 323 were actually prepared and tested. As a result, good white balance suitable for AV projectors was obtained without largely lowering the brightness compared with the projector using the rotary color filter 303 (or 303').

The case of using the UHP lamp having a low R emission intensity was exemplified above. This is also applicable to the case of using a lamp having different emission intensities for the R, G, and B light components. That is, the rotary color filter may include a larger region for a color light group including the color light component having the lowest emission intensity. Alternatively, the color light component having the lowest emission intensity may be allocated as the common color light component included in the two different color light groups. In this case, also, substantially the same effect is obtained. For example, in the case of using a halogen lamp, unlike the UHP lamp, the R light component has a high intensity while the B color component has a low intensity. In this case, the region for the color light group including B may be enlarged, or two color light groups commonly including B, such as magenta and cyan, may be used for the color regions.

Figure 19A:
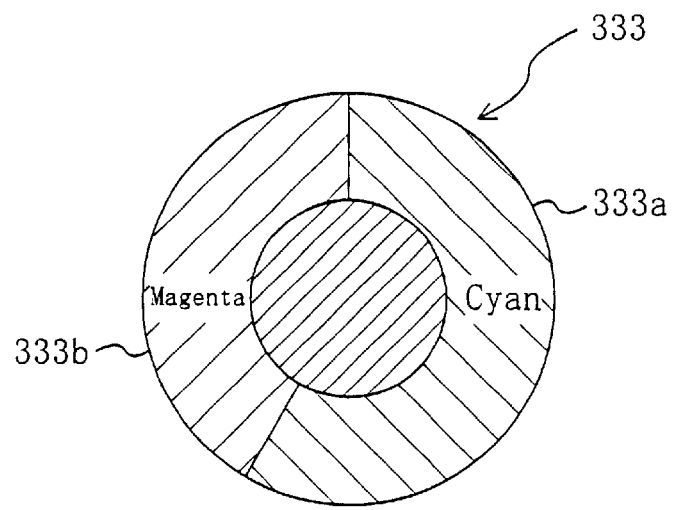
FIGS. 19A and 19B are illustrations of other rotary color filters used in EMBODIMENT 2.
Figure 19B:
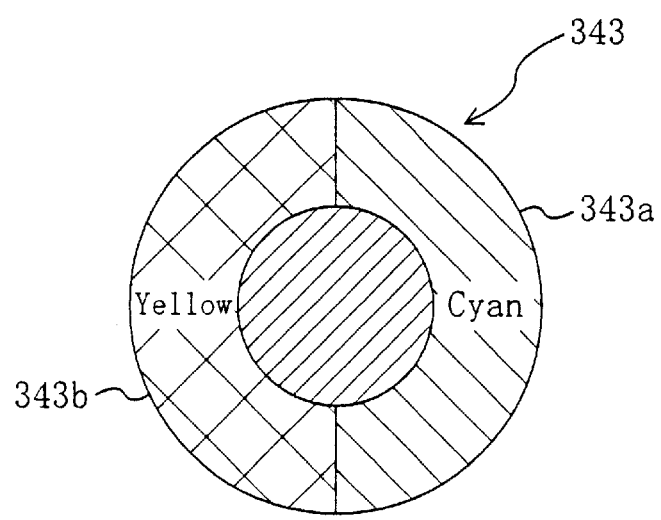
Figure 20:
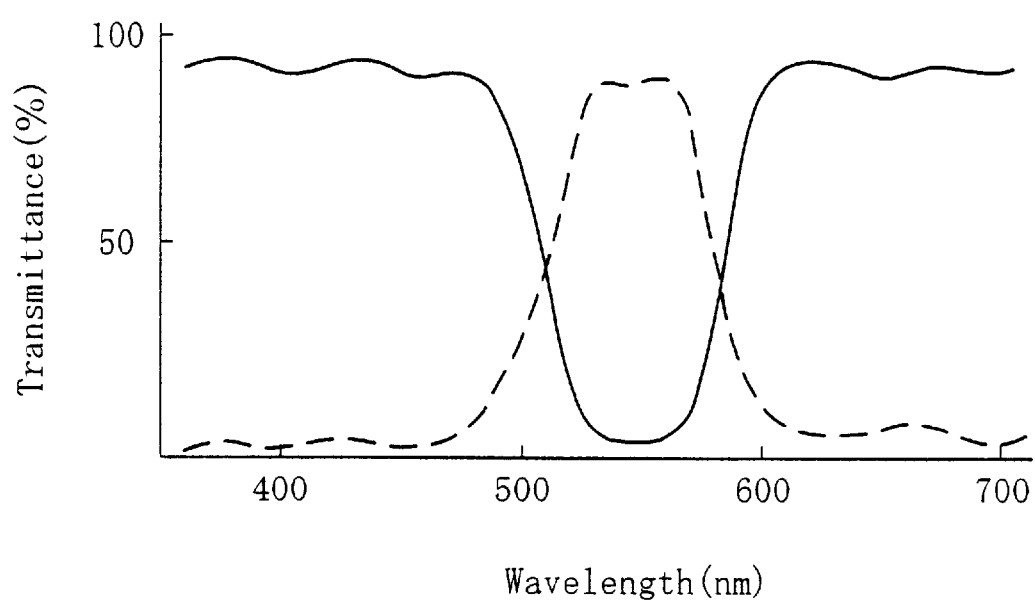
FIG. 20 shows the spectral characteristics of a polarization control element that rotates only a polarized light component in the green wavelength range.

Rotary color filters 333 and 343 shown in FIGS. 19A and 19B, respectively, may also be used for the image display apparatus 700 in place of the rotary color filter 303. The rotary color filter 333 shown in FIG. 19A has a cyan region 333*a* larger than a magenta region 333*b* by about 10%. The rotary color filter 343 shown in FIG. 19B has a cyan region 343*a* and a yellow region 343*b*. In the case of the rotary color filter 343 using cyan and yellow, used as the polarization control elements 104 and 111 is a polarization control element that rotates the polarization direction of only the G light component, having the characteristics shown in FIG. 20. As the polarization control elements 104 and 111, an element that rotates the polarization direction of only the R or B light component may also be used.

In the case of the rotary color filter 333 shown in FIG. 19A, the amount of the G light component having a high spectral luminous efficacy is substantially increased. The brightness can therefore be improved. In the case of the rotary color filter 343 shown in FIG. 19B, G is commonly included in the cyan and yellow regions. Therefore, the G color component is always incident on the reflection image display element 107-2 irrespective of the area of the color region and the rotational speed of the rotary color filter 343.

Projectors using the rotary color filters 333 and 343 were actually prepared and tested. As a result, the brightness improved about 1.2 times in the case of the rotary color filter 333 shown in FIG. 19A, about 1.5 times in the case of the rotary color filter 343 shown in FIG. 19B, compared with the projector using the rotary color filter 303 (or 303'). Although the white balance is tipped toward G by intensifying G, this is within an allowance as long as the projector is used for data projection.

Figure 21:
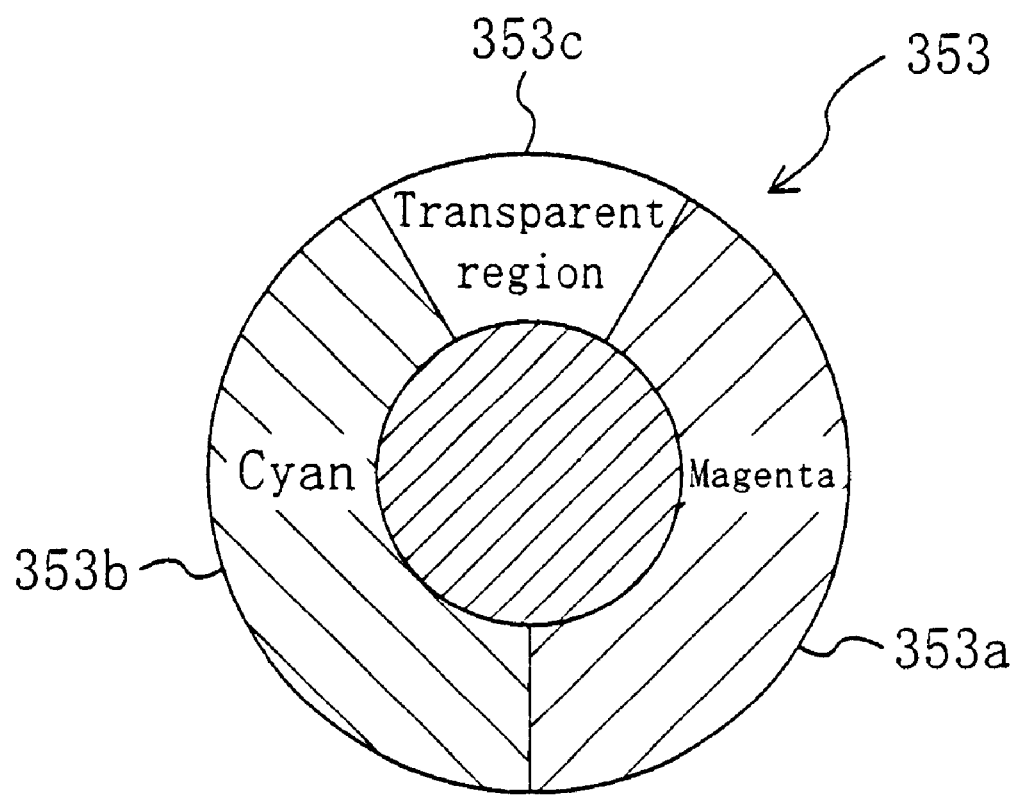
FIG. 21 is an illustration of a rotary color filter used in EMBODIMENT 2.

A Rotary color filter 353 shown in FIG. 21 may also be used for the image display apparatus 700 in place of the rotary color filter 303. The rotary color filter 353 has a magenta region 353*a*, a cyan region 353*b*, and a transparent region 353*c*. The transparent region 353*c* that transmits the white light beam occupies about 15% of the total area.

In the rotary color filter 353, the magenta region 353*a* and the cyan region 353*b* are used for color display, while the transparent region 353*c* is additionally used for white display. Using the transparent region 353*c* that transmits all the R, G, and B light components, the brightness improves. A projector using the rotary color filter 353 was actually prepared and tested. As a result, the brightness improved about 1.2 times compared with the projector using the rotary color filter 303 (or 303') while keeping the white balance and the R, G, and B color purities unchanged. The transparent region can also be provided for the other rotary color filters 313, 323, and 343 described above. Although the rotary color filter 353 has the magenta region 353*a* and the cyan region 353*b*, any other combinations of two different color groups including two of the R, G, and B three primary colors, such as the combination of magenta and yellow, can also be used.

Figure 22:
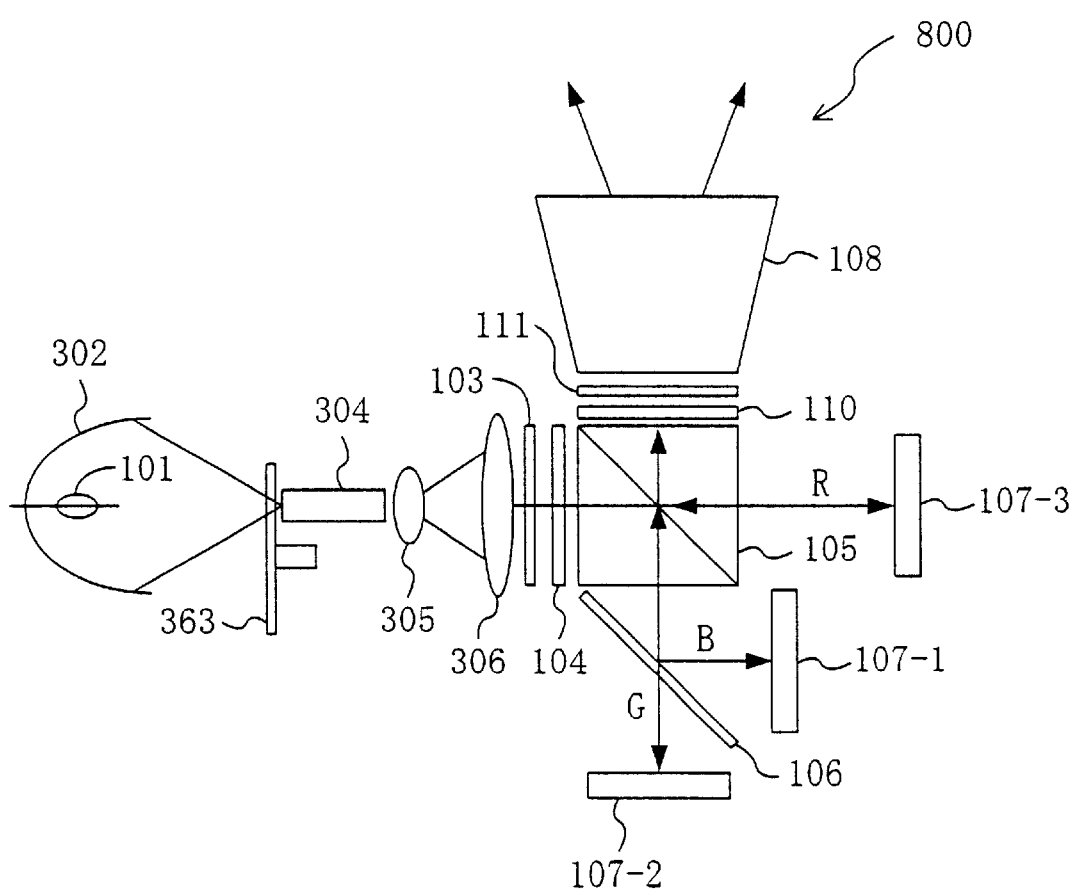
FIG. 22 is a schematic view of another projection color image display apparatus of EMBODIMENT 2 of the present invention.

FIG. 22 is a schematic view of another projection color image display apparatus 800 of EMBODIMENT 2 of the present invention.

Figure 23:
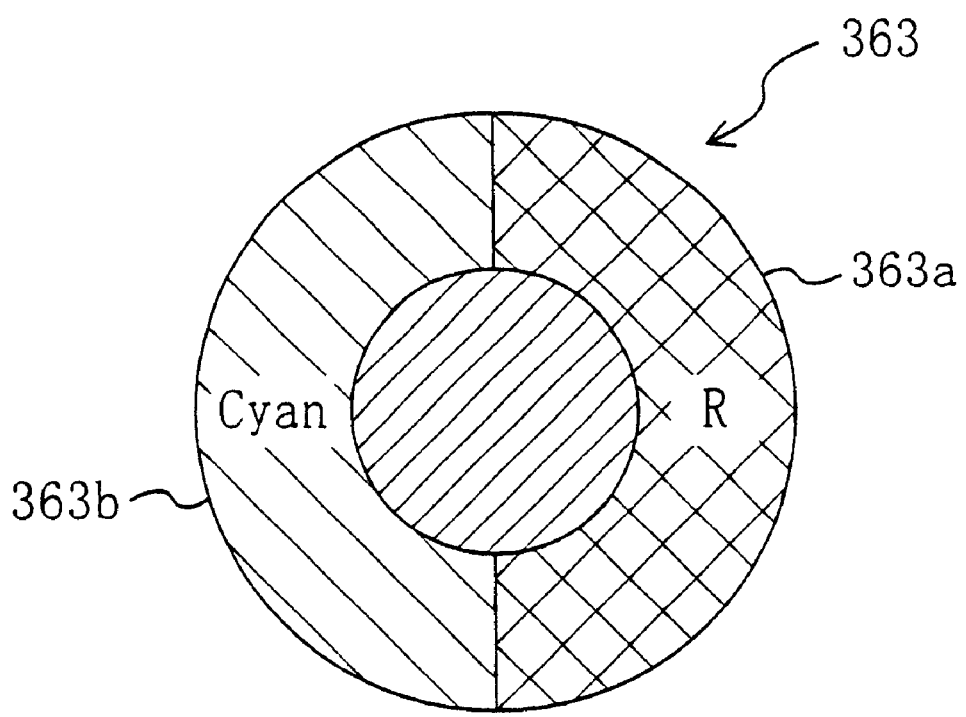
FIG. 23 is an illustration of a rotary color filter used in EMBODIMENT 2.

The image display apparatus 800 uses a rotary color filter 363 having an R region 363*a* and a cyan region 363*b* as shown in FIG. 23. A rotary color filter having a magenta region and a G region, or a yellow region and a B region may also be used. The sizes of the color regions may be adjusted according to the purpose. Otherwise, a rotary color filter having a transparent region that transmits all the R, G, and B light components, such as the rotary color filter 353 described above, may be used.

The polarizing plate 103 transmits only a polarized light component in the direction vertical to the plane of the figure, and the transmitted polarized light beam is incident on the polarization control element 104. The polarization control element 104, which has the same function as that described above, rotates the polarization direction of only the R light component in the direction parallel to the plane of the figure, and outputs the resultant light beam to the PBS 105. Once the light beam output from the polarization control element 104 is incident on the PBS 105, the B and G light components are reflected since they are s-polarized with respect to the PBS 105. The reflected light beam is then incident on a dichroic mirror 106, which reflects the B light component to be incident on a reflection image display element 107-1, and transmits the G light component to be incident on a reflection image display element 107-2. The R light component passes through the PBS 105 since it is p-polarized, and is incident on a reflection image display element 107-3.

The B, G, and R light beams modulated by the reflection image display elements 107-1, 107-2, and 107-3 according to image signals are reflected back toward the PBS 105, where only light components of which polarization directions have been modulated are allowed to be incident on the projection lens 108 and projected on a screen. As the reflection image display elements 107, used are 0.9 Type XGA panel liquid crystal display devices using a nematic liquid crystal material having a response speed of 6 msec. In this embodiment, the R light component and the cyan (color including the B and G components) light component are incident on the PBS 105 in a time-division manner via the rotary color filter 363. Therefore, during field 1 (the cyan region 363b of the rotary color filter 363), for example, the B and G light components are incident on the reflection image display elements 107-1 and 107-2, respectively, and during field 2 (the R region 363a), the R light component is incident on the reflection image display element 107-3. During field 1, therefore, the R light component is not incident on the reflection image display element 107-3. This enables an image signal that is to be displayed during the next field 2 to be written in the reflection image display element 107-3 in advance during this period.

Likewise, during field 2, image signals corresponding to the B and G light components can be written in the reflection image display elements 107-1 and 107-2 in advance. In this embodiment, since the rotary color filter 363 rotates at a period of 1/60 second, the time allocated for each of the fields 1 and 2 is about 8 msec, meaning that the color switches every about 8 msec. If a liquid crystal material having a shorter response time (higher response speed) than 8 msec is used, image display with no blanking time is possible and thus the brightness improves.

In the image display apparatus 800, the rotary color filter 363 rotated at a period of 1/60 second. It may be rotated at a double or higher speed. In place of increasing the rotational speed of the rotary color filter 363, the number of division regions of the rotary color filter may be increased. In this case, also, substantially the same effect is obtained. Even if the response time of the liquid crystal material is longer than the time allocated for each field, the effect of improving the brightness is obtained since the blanking time can be shortened.

Figure 24:
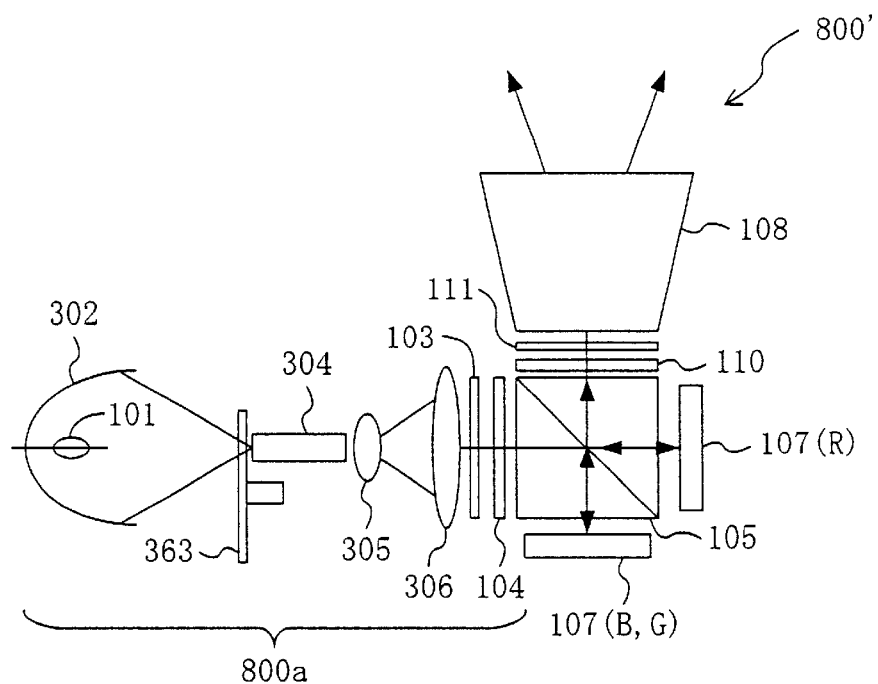
FIG. 24 is a schematic view of yet another projection color image display apparatus of EMBODIMENT 2 of the present invention.

The image display apparatus 800 used three reflection image display elements. A construction using two reflection image display elements, such as an image display apparatus 800' shown in FIG. 24, is also possible. In this case, since one of the reflection image display elements corresponds to two colors of the R, G, and B colors, a color filter may be provided for this reflection image display element. If a liquid crystal material having a sufficiently high response speed is used, the two light beams are not necessarily incident in a time division manner, but the R, G, B light beams may be incident simultaneously.

The polarization control element 110 and the polarizing plate 111 are placed between the PBS 105 and the projection lens 108. The polarization control element 110 may be the same element as that used as the polarization control element 104, and serves to rotate the polarization direction of only the R light component, to equalize the polarization directions of the R, G, and B light components. The polarizing plate 111 serves to cut a leak light component of the light beam output from the polarization control element 110 that should have been cut by the PBS 105, so as to improve the contrast ratio. The image display apparatus 800 succeeded in improving the brightness about 1.5 times compared with the conventional single-panel type projector of the field sequential method.

In the image display apparatus 800, the polarization control elements 104 and 110 rotated the polarization direction of the R light component. Alternatively, the polarization direction of the B or G light component may be rotated, and the p- and s-polarization of the color light components incident on the PBS 105 may be reversed.

In this embodiment, the white light beam was split into the B/G light beam and the R light beam. The combination may be changed to, for example, the G/R light beam and the B light beam. This change can be done only by changing the color light component of which polarization direction is rotated by the polarization control elements 104 and 110.

In this embodiment, the polarizing plates and the polarization control elements were placed on both the incident side and the outgoing side of the PBS 105. However, the polarization control element 110 and the polarizing plate 111 on the outgoing side are not necessarily required.

Figure 25:
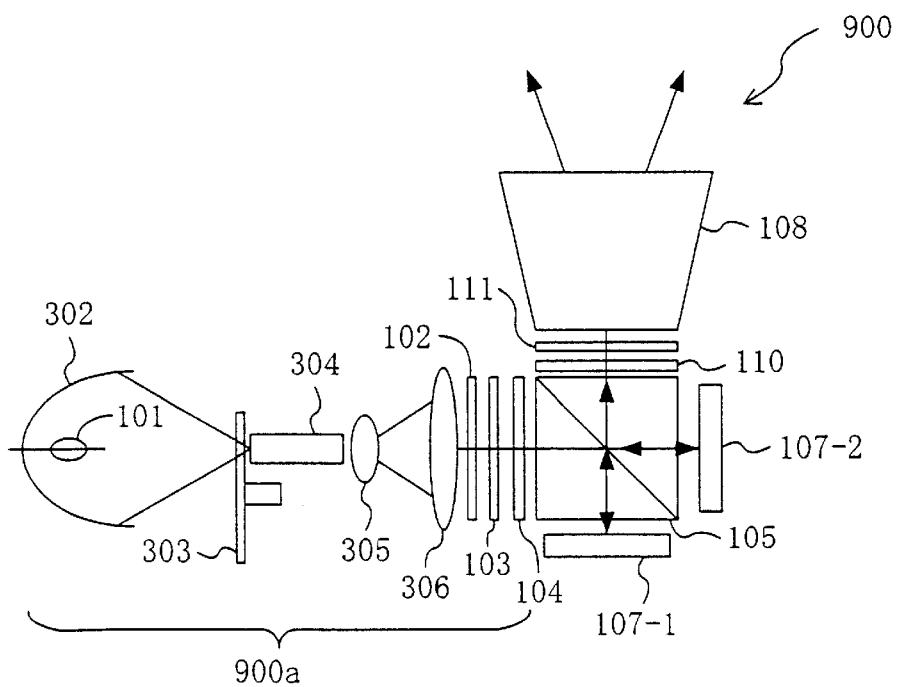
FIG. 25 is a schematic view of yet another projection color image display apparatus of EMBODIMENT 2 of the present invention.

(Embodiment of wavelength regulation element) FIG. 25 is a schematic view of yet another projection color image display apparatus 900 of EMBODIMENT 2 of the present invention. The image display apparatus 900 is different from the image display apparatus 700 shown in FIG. 15 in that an illumination optical system 900a includes a wavelength regulation element 102.

In general, the polarization control elements 104 and 110 have the characteristics as shown in FIG. 26. In FIG. 26, the solid line and the dashed line respectively represent the characteristics of the light beam reflected and transmitted by the PBS 105 in the optical system shown in FIG. 3. As is seen from FIG. 26, light components of different polarization directions are mixed in the color boundary range (hatched portion in the figure). The light components in this wavelength range therefore fail to be led to either optical path by the PBS 105, resulting in lowering in color purity.

In black display, the light components in the above wavelength range reflected from the reflection image display element 107 are incident on the PBS 105, and a slight amount of the light components determined depending on the extinction ratio of the PBS 105 may be incident on the polarization control element 110. Since the light components in the above wavelength range have different polarization directions, the polarization plate 111 fails to completely cut the light components in this wavelength range, resulting in lowering in contrast ratio.

Figure 27:
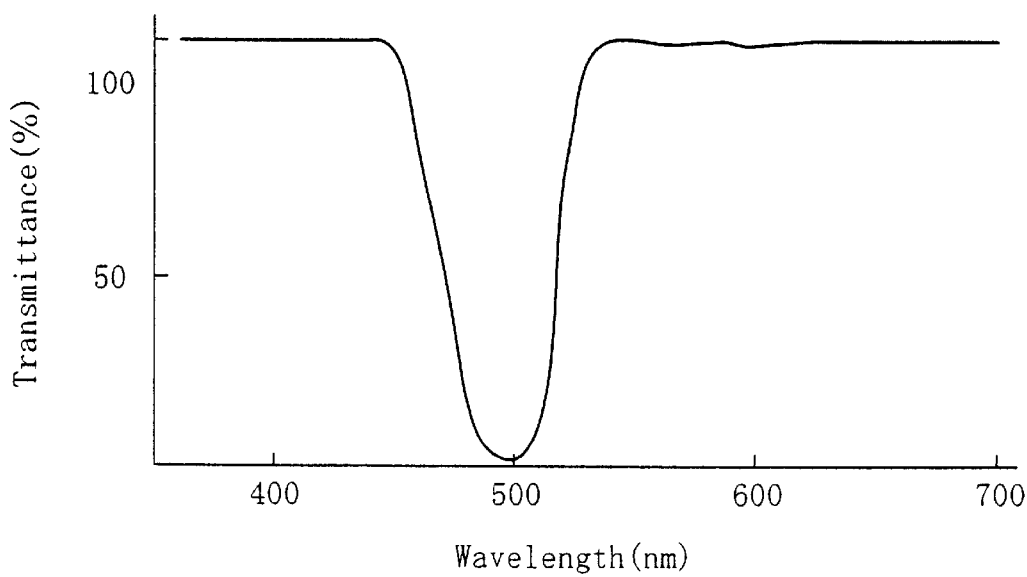
FIG. 27 is an illustration of the spectral characteristics of a trimming filter.

In order to solve the above problem, the image display apparatus 900 includes the trimming filter (polarization regulation element) 102 having the spectral transmittance characteristics as shown in FIG. 27. With this trimming filter, the light components in the color boundary wavelength range (hatched portion in FIG. 26) are prevented from entering the polarization control element 104. This results in good color purity and a contrast ratio twice or more as high as that of the image display apparatus 700.

The trimming filter 102 may be of a reflection type made by thin film evaporation or an absorption type made of a pigment and the like. In the image display apparatus 900, the trimming filter 102 was inserted between the field lens 306 and the polarizing plate 103 as shown in FIG. 25. Substantially the same effect can also be obtained by inserting the trimming filter 102 anywhere on the optical path between the light source 101 and the projection lens 108.

Figure 28:
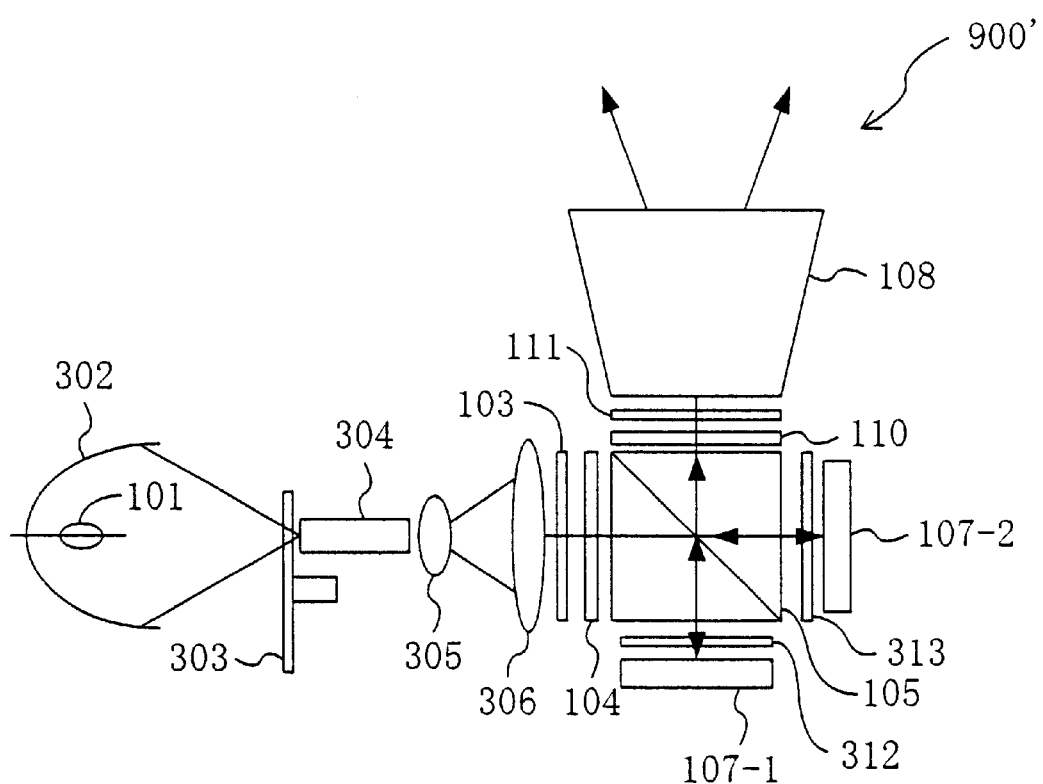
FIG. 28 is a schematic view of yet another projection color image display apparatus of EMBODIMENT 2 of the present invention.

FIG. 28 is a schematic view of yet another reflection color image display apparatus 900' of EMBODIMENT 2 of the present invention. The image display apparatus 900' is different from the image display apparatus 700 shown in FIG. 15 in that polarization regulation elements 312 and 313 are placed between the PBS 105 and the reflection image display elements 107-1 and 107-2, respectively.

As described above, since the polarization control elements 104 and 110 have the characteristics as shown in FIG. 26, light components of different polarization directions are mixed in the color boundary range (hatched portion in FIG. 26). The light components in this wavelength range therefore fail to be led to either optical path by the PBS 105, resulting in lowering in color purity.

Further, in reality, a light component in a wavelength range other than the color boundary wavelength range (hatched portion in FIG. 26) may pass through the polarization control elements 104 and 110 even when the polarization direction thereof is different from that allowed to pass through the polarization control elements 104 and 110 (exhibited as the ripple portion in FIG. 26). Light components corresponding to such a ripple portion also fail to be led to its right optical path by the PBS 105, resulting in lowering the color purity.

In black display, the light components corresponding to the ripple portion reflected from the reflection image display element 107 are incident on the PBS 105, and a slight amount of the light components determined depending on the extinction ratio of the PBS 105 may be incident on the polarization control element 110. Since the light components corresponding to the ripple portion have different polarization directions, the polarization plate 111 fails to completely cut the light components corresponding to the ripple portion, resulting in lowering in contrast ratio.

Figure 29:
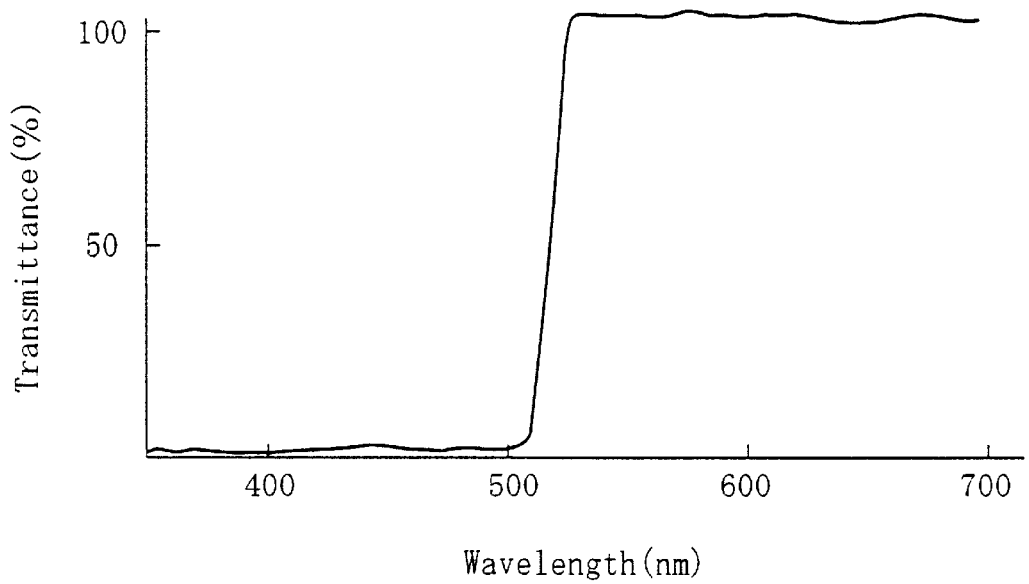
FIG. 29 shows the spectral characteristics of a color filter.
Figure 30:
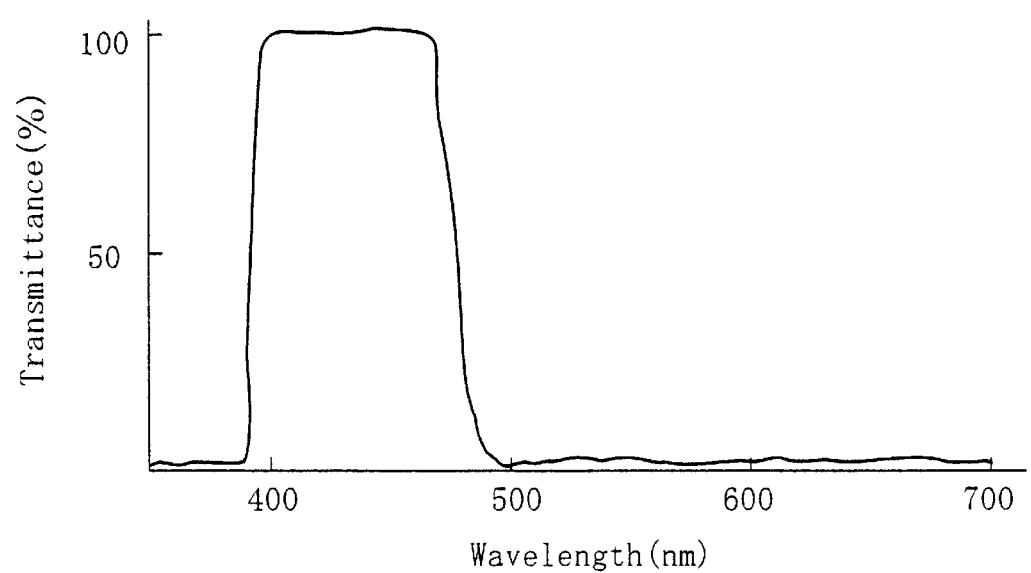
FIG. 30 shows the spectral characteristics of another color filter.
Figure 31:
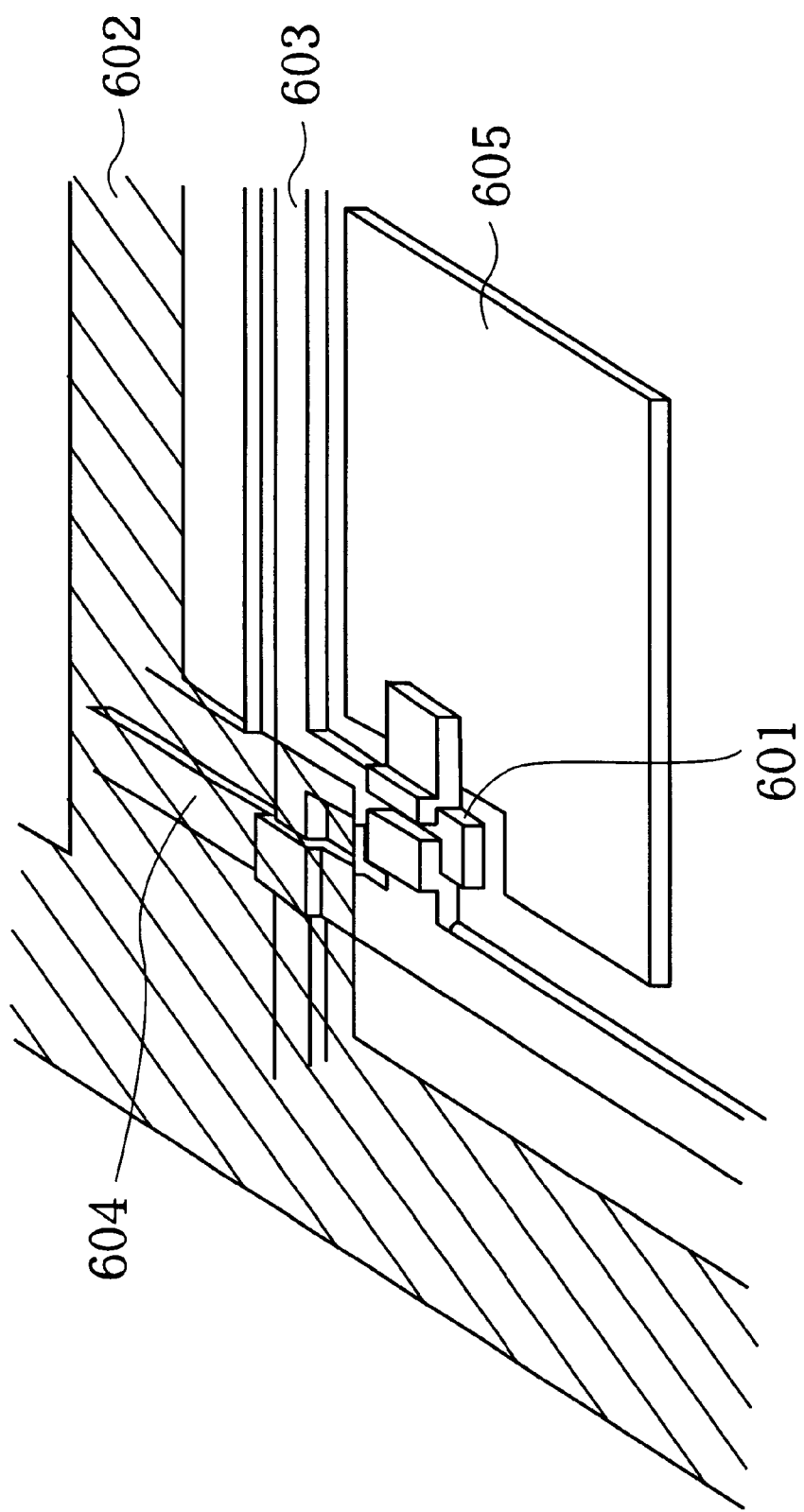
FIG. 31 is an illustration of a pixel portion of a transmission liquid crystal display device.
Figure 32:
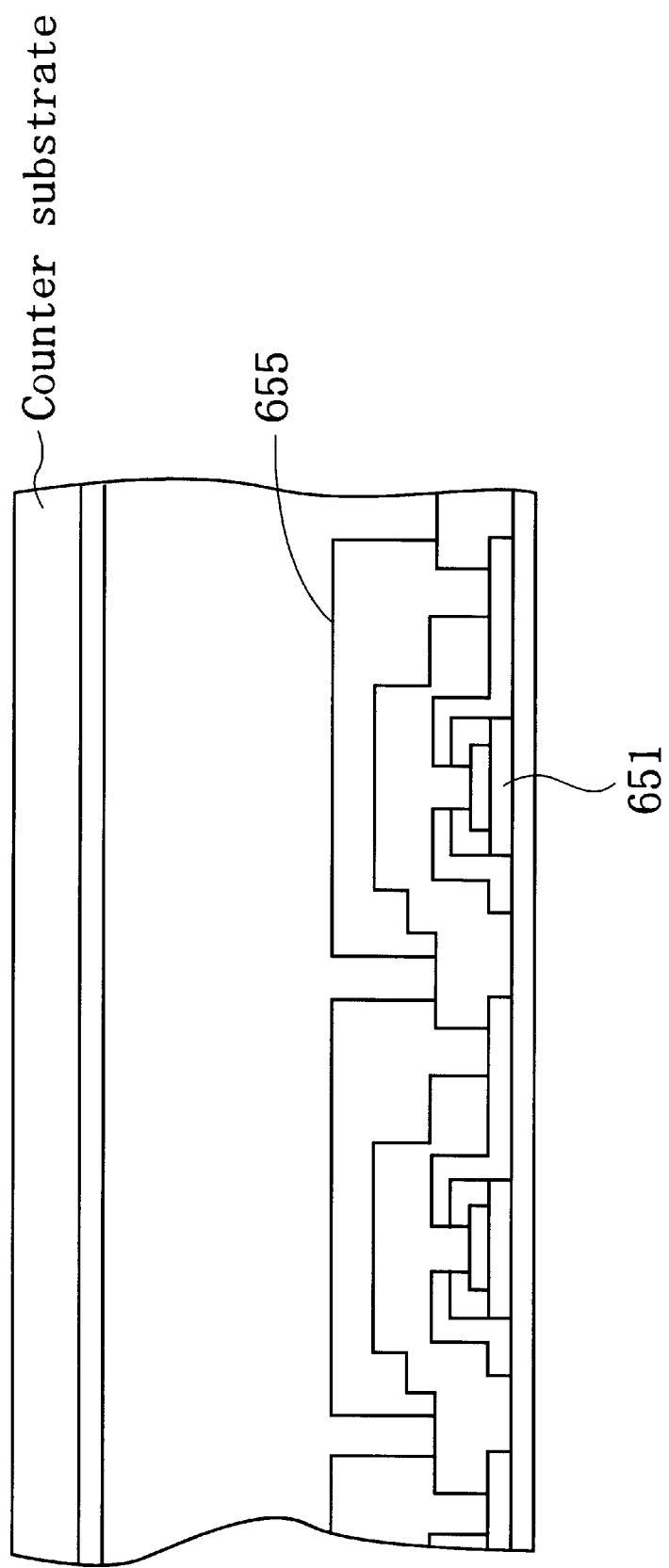
FIG. 32 is an illustration of a reflection liquid crystal display device.

In order to solve the above problem, the image display apparatus 900' includes the color filter (wavelength regulation element) 312 having the spectral transmission characteristics as shown in FIG. 29 immediately in front of the reflection image display element 107-1, and the color filter (wavelength regulation element) 313 having the spectral transmission characteristics as shown in FIG. 30 immediately in front of the reflection image display element 107-2, in place of the wavelength regulation element 102 in the image display apparatus 900. These color filters cut light components in the wavelength ranges that should not be incident on the reflection image display elements 107-1 and 107-2. Thus, images with good color purity and a high contrast ratio are obtained.

Improvement in color purity is ensured if two color filters are inserted as in the image display apparatus 900'. If only one color filter is used, it may be inserted in front of either reflection image display element.

The reflection image display element that always receives only one color light component will result in receiving such unwanted light components that should not be incident thereon for the other two color light components. In the case where only one color filter is used, therefore, it is more effective to insert the color filter in front of this reflection image display element. Actually, in the image display apparatus 900', insertion of the color filter only in front of the reflection image display element 107-2 was about 1.8 times as effective as insertion of the color filter only in front of the other reflection display element.

As a matter of course, by combining the color filters 312 and 313 in the image display apparatus 900' with the trimming filter 102 in the image display apparatus 900, the color purity and the contrast ratio further improved.

Thus, as described above, in EMBODIMENT 2 of the present invention, the image display apparatus uses in combination the rotary color filter having regions for different color light components and the polarization control element for rotating the polarization direction of only a light component in a specific wavelength range. With this construction, two of the R, G, and B color light components are always used by the reflection image display elements. This makes it possible to drastically improve the brightness compared with the conventional single-panel field sequential method without significantly increasing the size and cost.

Adjustment of white balance of incident light on a screen and improvement in brightness are realized by adjusting the areas of the color selection regions of the rotary color filter (that is, the durations of the selection of the color light components) without lowering other performance.

A color light component having a low or high emission intensity is allocated as the common color light component included in the two different color light regions of the rotary color filter. This permits adjustment of white balance of incident light on a screen and improvement in brightness without lowering other performance, as in the case of the adjustment between the color light components described above. Moreover, the brightness in white display further improves by providing a transparent region in addition to the above two color light regions for the rotary color filter.

The insertion of the trimming filter and the color filter compensates insufficient polarization rotation by the optical characteristics of the polarization control element, resulting in improving the color purity and the contrast ratio.

While the present invention has been described in a preferred embodiment, it will be apparent to those skilled in the art that the disclosed invention may be modified in numerous ways and may assume many embodiments other than that specifically set out and described above. Accordingly, it is intended by the appended claims to cover all modifications of the invention that fall within the true spirit and scope of the invention.

What is claimed is:

1. An image display apparatus comprising:
    an illumination optical system for outputting a light beam of red, green, and blue three primary color light components in the state where two of the three color light components are different in polarization direction from the other color light component;
    a beam splitter for splitting the light beam output from the illumination optical system according to the polarization direction;
    a color separator for separating the two color light components having the same polarization direction:
    a plurality of reflection image display elements for modulating the light beams separated by the beam splitter and the color separator; and
    a projection optical system for projecting the light beams modulated by the plurality of reflection image display elements.

2. The apparatus of claim 1, wherein the angle formed by a beam splitting plane of the beam splitter and a color separation plane of the color separator is 20° or less.

3. The apparatus of claim 1, wherein the illumination optical system comprises: a light source for emitting the light beam of the three primary color light components; and a first polarization control element for changing the polarization direction of at least one of the three primary color light components.

4. The apparatus of claim 3, further comprising a polarization selection element for transmitting or reflecting only a polarized light beam having a given polarization direction placed on an optical path on the light incident side of the first polarization control element.

5. The apparatus of claim 1, wherein the color separation plane of the color separator is sandwiched by two substrates.

6. The apparatus of claim 5, wherein a transparent substrate is placed on at least one of optical paths of the light beams split by the beam splitter.

7. The apparatus of claim 1, wherein the color separator is a square pole prism made of two triangle pole prisms bonded to each other.

8. The apparatus of claim 7, wherein the principal ray of a light beam incident on and outgoing from the square pole prism is roughly in parallel with the normal of an incidence plane and an outgoing plane of the square pole prism, and the principal ray is incident on a beam splitting plane of the square pole prism at an angle less than 45° with respect to the normal of the beam splitting plane.

9. The apparatus of claim 1, wherein the color separation plane of the color separator is formed on a surface of a substrate so as to face the beam splitter and transmits the blue light component, and the two color light components having the same polarization direction include the blue light component.

10. The apparatus of claim 1, further comprising a second polarization control element for equalizing the polarization directions of the red, green, and blue three primary color light components on the side of the beam splitter closer to the projection optical system.

11. The apparatus of claim 10, further comprising a polarization selection element for transmitting or reflecting only a polarized light beam having a given polarization direction on an optical path on the light outgoing side of the second polarization control element.

12. The apparatus of claim 1, wherein at least one wavelength regulation element is inserted on the optical path between the light source and the projection optical system.

13. The apparatus of claim 12, wherein the wavelength regulation element cuts a light beam in a wavelength range at the boundary between the light beam of which polarization direction is changed by the first polarization control element and another light beam.

14. The apparatus of claim 12, wherein the wavelength regulation element is placed at least one of optical paths of the light beams split by the beam splitter, and cuts the light beams other than the light beam corresponding to any of the plurality of reflection image display elements placed on the optical path on which the wavelength regulation element is placed.

15. The apparatus of claim 12, wherein the wavelength regulation element cuts a light component in at least one of a red-green boundary wavelength range and a green-blue boundary wavelength range.

16. The apparatus of claim 12, wherein the wavelength regulation element is placed between the beam splitter and any of the reflection image display elements, and a light regulation plane of the wavelength regulation element is tilted at an angle with respect to an image display plane of the reflection image display element.

17. The apparatus of claim 16, wherein the angle of the light regulation plane of the wavelength regulation element with respect to the image display plane of the reflection image display element is in the range of 1.5° to 13.5°.

18. The apparatus of claim 1, wherein the green light component among the red, green, and blue primary color light components is included in the two color light components having the same polarization direction.

19. The apparatus of claim 1, wherein the beam splitting plane of the beam splitter has a transmittance for p-polarized light and a reflectance for s-polarized light one of which is higher than the other, and the light beam split by the beam splitter as the polarized light having the higher transmittance or reflectance is incident on two or more of the plurality of reflection image display elements.

20. The apparatus of claim 1, wherein the beam splitting plane of the beam splitter has a transmittance for p-polarized light and a reflectance for s-polarized light one of which is higher than the other, and the green light beam is split by the beam splitter as the polarized light having the higher transmittance or reflectance.

21. An image display apparatus comprising:

an illumination optical system for dividing a light beam of red, green, and blue three primary color light components into two color light groups, sequentially switching the two color light groups in a time-division manner, and outputting after changing the polarization direction of two of the three primary color light components to be different from the polarization direction of the other color light component;

a beam splitter for splitting the light beam output from the illumination optical system according to the polarization direction;

a plurality of reflection image display elements for modulating light beams split by the beam splitter; and a projection optical system for projecting the light beams modulated by the plurality of reflection image display elements.

22. The apparatus of claim 21, wherein the illumination optical system includes: a light source for emitting the light beam of the three primary color light components; a color switch element for sequentially switching the two different color light groups each including two of the three primary color light components emitted from the light source; and a first polarization control element for changing the polarization direction of the color light component commonly included in the two different color light groups or the polarization direction of the two color light components other than the common color light component.

23. The apparatus of claim 21, wherein the illumination optical system includes: a light source for emitting the light beam of the three primary color light components; a color switch element for sequentially switching one color light group including two of the three primary color light components emitted form the light source and the other one color light component; and a first polarization control element for changing the polarization direction of one of the two color light components included in the color light group or the other one color light component.

24. The apparatus of claim 22, further comprising a second polarization control element having substantially the same function as the first polarization control element on the side of the beam splitter closer to the projection optical system.

25. The apparatus of claim 23, further comprising a second polarization control element having substantially the same function as the first polarization control element on the side of the beam splitter closer to the projection optical system.

26. The apparatus of claim 22, further comprising a polarization selection element for transmitting only a polarized light component having a given polarization direction on a light path on the light incident side of the first polarization control element.

27. The apparatus of claim 23, further comprising a polarization selection element for transmitting only a polarized light component having a given polarization direction on a light path on the light incident side of the first polarization control element.

28. The apparatus of claim 24, further comprising a polarization selection element for transmitting only a polarized light component having a given polarization direction on a light path on the light outgoing side of the second polarization control element.

29. The apparatus of claim 25, further comprising a polarization selection element for transmitting only a polarized light component having a given polarization direction on a light path on the light outgoing side of the second polarization control element.

30. The apparatus of claim 22, wherein the color switch element keeps selecting the color light group including a color light component having a lower intensity than the other of the two color light components other than the common color light component included in the two different color light groups for a longer time than the color light group including the other color light component.

31. The apparatus of claim 22, wherein the green color light component is included only in one of the two different color light groups selected by the color switch element, and the color switch element keeps selecting the color light group including the green color light component for a longer time than the other color light group.

32. The apparatus of claim 23, wherein the color switch element selects between the color light group including two color light components and the other one color light component so that the color light component having the lowest intensity among the three primary color light components is included in either the color light group including two color light components or the other one color light component whichever is kept selected for a longer time.

33. The apparatus of claim 23, wherein the color switch element selects between the color light group including two color light components and the other one color light component so that the green light component is included in either the color light group including two color light components or the other one color light component whichever is kept selected for a longer time.

34. The apparatus of claim 22, wherein the common color light component included in the two different color light groups is a light component having the lowest intensity among the three primary color light components.

35. The apparatus of claim 22, wherein the common color light component included in the two different color light groups is the green light component.

36. The apparatus of claim 22, wherein the color switch element simultaneously selects the red, green, and blue primary color light components for a given period of time.

37. The apparatus of claim 23, wherein the color switch element simultaneously selects the red, green, and blue primary color light components for a given period of time.

38. The apparatus of claim 21, wherein the plurality of reflection image display elements comprise two reflection image display elements, one corresponding to one of the three primary color light components and the other corresponding to the remaining two color light components.

39. The apparatus of claim 21, wherein at least one wavelength regulation element is inserted on an optical path between the illumination optical system and the projection optical system.

40. The apparatus of claim 39, wherein the wavelength regulation element is placed between the beam splitter and at least one of the plurality of reflection image display elements and selectively transmits a color light beam used for display by the at least one reflection image display element.

41. The apparatus of claim 39, wherein the wavelength regulation element is placed between the beam splitter and one of the plurality of reflection image display elements on which the common color light component included in the two different color light groups is incident, and selectively transmits the common color light component.

42. The apparatus of claim 39, wherein the wavelength regulation element cuts a light component in a wavelength range at a boundary between a light component of which polarization direction is changed by the polarization control element and another light component.

* * * * *